US 8,370,808 B2

(12) United States Patent
Ohta et al.

(10) Patent No.: US 8,370,808 B2
(45) Date of Patent: Feb. 5, 2013

(54) APPARATUS AND A METHOD FOR GENERATING A TEST CASE

(75) Inventors: Akinori Ohta, Kanagawa-ken (JP); Hiromasa Shin, Kanagawa-ken (JP); Mikito Iwamasa, Tokyo (JP); Yusuke Endoh, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 12/724,096

(22) Filed: Mar. 15, 2010

(65) Prior Publication Data

US 2010/0235814 A1 Sep. 16, 2010

(30) Foreign Application Priority Data

Mar. 16, 2009 (JP) ................................ 2009-063281

(51) Int. Cl.
*G06F 9/44* (2006.01)
*G06F 11/00* (2006.01)
(52) U.S. Cl. ........................ 717/124; 717/131; 714/38.1
(58) Field of Classification Search .................. 717/124, 717/131; 714/38.1
See application file for complete search history.

(56) References Cited

U.S. PATENT DOCUMENTS

| 6,038,378 | A | * | 3/2000 | Kita et al. | 714/38.11 |
| 7,584,455 | B2 | * | 9/2009 | Ball | 717/124 |
| 2009/0271139 | A1 | | 10/2009 | Shin | |
| 2010/0235685 | A1 | | 9/2010 | Shin | |

FOREIGN PATENT DOCUMENTS

JP 2009-211503 9/2009

OTHER PUBLICATIONS

Office Action issued Aug. 24, 2012 in Japanese Application No. 2009-063281.
Hiromasa Shin, et al., "A Test-case Generation from Quotient Transition System", Proceedings of the Symposium on Information Processing Society of Japan, 2008, pp. 167-174 (With English Abstract).
Harold Abelson, et al., "Structure and Interpretation of Computer Programs", MIT Press, http://mitpress.mit.edu/sicp/full-text/book/book-Z-H-10.html#, 1996, pp. 1-6.
Margus Veanes, et al., "Model-Based Testing of Object-Oriented Reactive Systems with Spec Explorer", Test Generation, Chapter 5, 2005, pp. 1-36.
G. Friedman, et al., "Projected State Machine Coverage for Software Testing", Chapter 2, Sec 2, Projected State Machine, 2002, pp. 134-143.
Harold Thimbleby, "The Directed Chinese Postman Problem", In Software-Practice and Experience (SPE), vol. 33, 2003, pp. 1-17.

* cited by examiner

*Primary Examiner* — Li B Zhen
*Assistant Examiner* — Hui-Wen Lin
(74) *Attorney, Agent, or Firm* — Oblon, Spivak, McClelland, Maier & Neustadt, L.L.P.

(57) ABSTRACT

A state-transition system includes a plurality of states and a first transition representing a state-change based on an external event occurred into a system to be checked. A plurality of requirement items includes a precondition and a postcondition in correspondence with the external event. By partially selecting the precondition and the postcondition from the plurality of requirement items, a state map to map a state onto truth values of the precondition and the postcondition is generated. By contracting the state-transition system with the state map, a quotient state-transition system is generated. The quotient state-transition system includes a plurality of second transitions among a plurality of groups each having states. By tracing each second transition in the quotient state-transition system, a representative transition path is generated. The representative transition path is regenerated as a transition path in the state-transition system. The transition path is output as a test case.

6 Claims, 37 Drawing Sheets

| REQUIREMENT ID | PRECONDITION | EVENT | POSTCONDITION |
|---|---|---|---|
| 1 | P1∧¬P2∧¬P3 | CRUISE SWITCH : ON | P2 |
| 2 | P2 | SET SWITCH : ON | P3 |

FIG. 5

| ATOMIC PREDICATE ID | ATOMIC PREDICATE (NATURAL LANGUAGE) |
|---|---|
| P1 | VARIABLE vel (VELOCITY) : $\geqq 40$ |
| P2 | VARIABLE cruise (CRUISE LAMP) : ON |
| P3 | VARIABLE set (SET LAMP) : ON |

FIG. 6

| TID | SID0 | SID1 | EVENT |
|---|---|---|---|
| 0 | 0 | 1 | Accel |
| 1 | 1 | 2 | Accel |
| 3 | 2 | 3 | Accel |
| 5 | 3 | 4 | Accel |
| 7 | 4 | 6 | Accel |
| 10 | 6 | 7 | CruiseOn |
| 11 | 7 | 3 | Brake |
| 5 | 3 | 4 | Accel |
| 8 | 4 | 5 | CruiseOn |
| 9 | 5 | 2 | Brake |
| 3 | 2 | 3 | Accel |
| 6 | 3 | 1 | Brake |
| 1 | 1 | 2 | Accel |
| 4 | 2 | 0 | Brake |
| 0 | 0 | 1 | Accel |
| 2 | 1 | 0 | Brake |

FIG. 9

| TID | SID0 | SID1 | EVENT |
|---|---|---|---|
| 0 | 0 | 1 | Accel |
| 1 | 1 | 2 | Accel |
| 3 | 2 | 3 | Accel |
| 5 | 3 | 4 | Accel |
| 8 | 4 | 5 | CruiseOn |
| 11 | 5 | 2 | Brake |
| 3 | 2 | 3 | Accel |

FIG. 11

| REQUIREMENT ID | PRECONDITION | EVENT | POSTCONDITION |
|---|---|---|---|
| 1 | (define(P1notP2notP3 s) (and(P1 s)(not(P2 s))(not(P3 s)))) | CRUISE SWITCH : ON | P2 |
| 2 | P2 | SET SWITCH : ON | P3 |

FIG. 12

| ATOMIC PREDICATE ID | ATOMIC PREDICATE (NATURAL LANGUAGE) | ATOMIC PREDICATE (FORMAL) |
|---|---|---|
| P1 | VARIABLE vel (VELOCITY) : ≧ 40 | (define(P1 s) (>=(getval s 'vel) 40)) |
| P2 | VARIABLE cruise (CRUISE LAMP) : ON | (define(P2 s) (equal? (getval s 'cruise) 'ON)) |
| P3 | VARIABLE set (SET LAMP) : ON | (define(P3 s) (equal? (getval s 'set) 'ON)) |

} IF A STATE IS GIVEN TO AN ARGUMENT, THE STATE IS FORMATTED AS A FUNCTION TO REPLY SATISFIABILITY OF THE CONDITION (IN CASE OF Scheme)

FIG. 13

| SID | STATE |
|---|---|
| 0 | ((vel 0) (cruise Off) (set Off)) |
| 1 | ((vel 10) (cruise Off) (set Off)) |
| 2 | ((vel 20) (cruise Off) (set Off)) |
| 3 | ((vel 30) (cruise Off) (set Off)) |
| 4 | ((vel 40) (cruise Off) (set Off)) |
| 5 | ((vel 40) (cruise On) (set Off)) |
| 6 | ((vel 40) (cruise On) (set On)) |
| 7 | ((vel 50) (cruise Off) (set Off)) |
| 8 | ((vel 50) (cruise On) (set Off)) |
| 9 | ((vel 50) (cruise On) (set On)) |

FIG. 14

| T1 | SID0 | SID1 | EVENT |
|---|---|---|---|
| 0 | 0 | 1 | Accel |
| 1 | 1 | 2 | Accel |
| 2 | 1 | 0 | Brake |
| 3 | 2 | 3 | Accel |
| 4 | 2 | 0 | Brake |
| 5 | 3 | 4 | Accel |
| 6 | 3 | 1 | Brake |
| 7 | 4 | 7 | Accel |
| 8 | 4 | 2 | Brake |
| 9 | 4 | 5 | CruiseOn |
| 10 | 5 | 8 | Accel |
| 11 | 5 | 2 | Brake |
| 12 | 5 | 6 | Set |
| 13 | 6 | 9 | Accel |
| 14 | 6 | 2 | Brake |
| 15 | 6 | 6 | Set |
| 16 | 7 | 3 | Brake |
| 17 | 7 | 8 | CruiseOn |
| 18 | 8 | 3 | Brake |
| 19 | 8 | 9 | Set |
| 20 | 9 | 3 | Brake |
| 21 | 9 | 9 | Set |

FIG. 15

| TID | SID0 | SID1 | EVENT |
|---|---|---|---|
| 0 | 0 | 1 | Accel |
| 1 | 1 | 2 | Accel |
| 3 | 2 | 3 | Accel |
| 5 | 3 | 4 | Accel |
| 9 | 4 | 5 | CruiseOn |
| 10 | 5 | 8 | Accel |
| 19 | 8 | 9 | Set |
| 21 | 9 | 9 | Set |
| 20 | 9 | 3 | Brake |
| 5 | 3 | 4 | Accel |
| 9 | 4 | 5 | CruiseOn |
| 11 | 11 | 2 | Brake |
| 3 | 2 | 3 | Accel |
| 5 | 3 | 4 | Accel |
| 8 | 4 | 2 | Brake |
| Break | | | |

FIG. 16

| TID | SID0 | SID1 | EVENT |
|---|---|---|---|
| 0 | 0 | 1 | Accel |
| 1 | 1 | 2 | Accel |
| 3 | 2 | 3 | Accel |
| 5 | 3 | 4 | Accel |
| 9 | 4 | 5 | CruiseOn |
| 11 | 5 | 2 | Brake |
| 3 | 2 | 3 | Accel |
| Break | | | |

FIG. 21

| TID | SID0 | SID1 | EVENT |
|---|---|---|---|
| 0 | 0 | 1 | Accel |
| 1 | 1 | 2 | Accel |
| 3 | 2 | 3 | Accel |
| 5 | 3 | 4 | Accel |
| 9 | 4 | 5 | CruiseOn |
| 12 | 5 | 6 | Set |
| 13 | 6 | 9 | Accel |
| 20 | 9 | 3 | Brake |
| 5 | 3 | 4 | Accel |
| 9 | 4 | 5 | CruiseOn |
| 11 | 5 | 2 | Brake |
| Break | | | |

FIG. 23

TABLE 1

| SID | STATE | MAPPING RESULT |
|---|---|---|
| s0 | ((RUN (1)) (RDY (2 3)) (WAI ())) | (1 2 0) |
| s1 | ((RUN (2)) (RDY (3)) (WAI (1))) | (1 1 1) |
| s2 | ((RUN (2)) (RDY (3 1)) (WAI ())) | (1 2 0) |
| s3 | ((RUN (3)) (RDY (1)) (WAI (2))) | (1 1 1) |
| s4 | ((RUN (3)) (RDY (1 2)) (WAI ())) | (1 2 0) |
| s5 | ((RUN (3)) (RDY ()) (WAI (1 2))) | (1 0 2) |
| s6 | ((RUN (3)) (RDY (2)) (WAI (1))) | (1 1 1) |
| s7 | ((RUN (1)) (RDY (2)) (WAI (3))) | (1 1 1) |
| s8 | ((RUN (1)) (RDY ()) (WAI (2 3))) | (1 0 2) |
| s9 | ((RUN (1)) (RDY (3)) (WAI (2))) | (1 1 1) |
| s10 | ((RUN (2)) (RDY (1 3)) (WAI ())) | (1 2 0) |
| s11 | ((RUN (2)) (RDY ()) (WAI (1 3))) | (1 0 2) |
| s12 | ((RUN ()) (RDY ()) (WAI (1 2 3))) | (0 0 3) |
| s13 | ((RUN (2)) (RDY (1)) (WAI (3))) | (1 1 1) |
| s14 | ((RUN (3)) (RDY (2 1)) (WAI ())) | (1 2 0) |
| s15 | ((RUN (1)) (RDY (3 2)) (WAI ())) | (1 2 0) |

FIG. 31

TABLE 2

| TID | SID0 | SID1 | EVENT |
|---|---|---|---|
| t0 | s0 | s1 | ((sleep 1) ()) |
| t1 | s0 | s2 | ((yield 1) ()) |
| t2 | s2 | s3 | ((sleep 2) ()) |
| t3 | s2 | s4 | ((yield 2) ()) |
| t4 | s1 | s4 | ((wakeup 2 1) ()) |
| t5 | s1 | s5 | ((sleep 2) ()) |
| t6 | s1 | s6 | ((yield 2) ()) |
| t7 | s4 | s7 | ((sleep 3) ()) |
| t8 | s4 | s0 | ((yield 3) ()) |
| t9 | s3 | s0 | ((wakeup 3 2) ()) |
| t10 | s3 | s8 | ((sleep 3) ()) |
| t11 | s3 | s9 | ((yield 3) ()) |
| t12 | s6 | s10 | ((wakeup 3 1) ()) |
| t13 | s6 | s11 | ((sleep 3) ()) |
| t14 | s6 | s1 | ((yield 3) ()) |
| t15 | s5 | s1 | ((wakeup 3 2) ()) |
| t16 | s5 | s9 | ((wakeup 3 1) ()) |
| t17 | s5 | s12 | ((sleep 3) ()) |
| t18 | s5 | s5 | ((yield 3) ()) |
| t19 | s7 | s2 | ((wakeup 1 3) ()) |
| t20 | s7 | s11 | ((sleep 1) ()) |
| t21 | s7 | s13 | ((yield 1) ()) |
| t22 | s9 | s14 | ((wakeup 1 2) ()) |
| t23 | s9 | s5 | ((sleep 1) ()) |
| t24 | s9 | s3 | ((yield 1) ()) |
| t25 | s8 | s3 | ((wakeup 1 3) ()) |
| t26 | s8 | s13 | ((wakeup 1 2) ()) |
| t27 | s8 | s12 | ((sleep 1) ()) |
| t28 | s8 | s8 | ((yield 1) ()) |
| t29 | s11 | s6 | ((wakeup 2 3) ()) |
| t30 | s11 | s7 | ((wakeup 2 1) ()) |
| t31 | s11 | s12 | ((sleep 2) ()) |
| t32 | s11 | s11 | ((yield 2) ()) |
| t33 | s10 | s9 | ((sleep 2) ()) |
| t34 | s10 | s15 | ((yield 2) ()) |
| t35 | s13 | s15 | ((wakeup 2 3) ()) |
| t36 | s13 | s8 | ((sleep 2) ()) |
| t37 | s13 | s7 | ((yield 2) ()) |
| t38 | s14 | s13 | ((sleep 3) ()) |
| t39 | s14 | s10 | ((yield 3) ()) |
| t40 | s15 | s6 | ((sleep 1) ()) |
| t41 | s15 | s14 | ((yield 1) ()) |

FIG. 32

TABLE 3

| TID | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t16 | s5 | s9 | ((wakeup 3 1) ()) |
| t23 | s9 | s5 | ((sleep 1) ()) |
| t17 | s5 | s12 | ((sleep 3) ()) |
| break | | | |
| t1 | s0 | s2 | ((yield 1) ()) |
| t2 | s2 | s3 | ((sleep 2) ()) |
| t10 | s3 | s8 | ((sleep 3) ()) |
| t28 | s8 | s8 | ((yield 1) ()) |
| t27 | s8 | s12 | ((sleep 1) ()) |
| break | | | |
| t0 | s0 | s1 | ((sleep 1) ()) |
| t6 | s1 | s6 | ((yield 2) ()) |
| t13 | s6 | s11 | ((sleep 3) ()) |
| t30 | s11 | s7 | ((wakeup 2 1) ()) |
| t20 | s7 | s11 | ((sleep 1) ()) |
| t32 | s11 | s11 | ((yield 2) ()) |
| t31 | s11 | s12 | ((sleep 2) ()) |
| break | | | |
| t0 | s0 | s1 | ((sleep 1) ()) |
| t5 | s1 | s5 | ((sleep 2) ()) |
| t15 | s5 | s1 | ((wakeup 3 2) ()) |
| t6 | s1 | s6 | ((yield 2) ()) |
| t12 | s6 | s10 | ((wakeup 3 1) ()) |
| t34 | s10 | s15 | ((yield 2) ()) |
| t41 | s15 | s14 | ((yield 1) ()) |
| t38 | s14 | s13 | ((sleep 3) ()) |
| t37 | s13 | s7 | ((yield 2) ()) |
| t21 | s7 | s13 | ((yield 1) ()) |
| t35 | s13 | s15 | ((wakeup 2 3) ()) |
| t40 | s15 | s6 | ((sleep 1) ()) |
| t13 | s6 | s11 | ((sleep 3) ()) |
| t29 | s11 | s6 | ((wakeup 2 3) ()) |
| t14 | s6 | s1 | ((yield 3) ()) |
| t4 | s1 | s4 | ((wakeup 2 1) ()) |
| t7 | s4 | s7 | ((sleep 3) ()) |
| t19 | s7 | s2 | ((wakeup 1 3) ()) |
| t3 | s2 | s4 | ((yield 2) ()) |
| t8 | s4 | s0 | ((yield 3) ()) |
| t1 | s0 | s2 | ((yield 1) ()) |
| t2 | s2 | s3 | ((sleep 2) ()) |
| t10 | s3 | s8 | ((sleep 3) ()) |
| t26 | s8 | s13 | ((wakeup 1 2) ()) |
| t36 | s13 | s8 | ((sleep 2) ()) |
| t25 | s8 | s3 | ((wakeup 1 3) ()) |
| t11 | s3 | s9 | ((yield 3) ()) |
| t22 | s9 | s14 | ((wakeup 1 2) ()) |
| t39 | s14 | s10 | ((yield 3) ()) |
| t33 | s10 | s9 | ((sleep 2) ()) |
| t24 | s9 | s3 | ((yield 1) ()) |
| t9 | s3 | s0 | ((wakeup 3 2) ()) |
| break | | | |

FIG. 33

TABLE 4

| [SID] | SID | STATE | MAPPING RESULT |
|---|---|---|---|
| s0 | s0 | ((RUN (1)) (RDY (2 3)) (WAI ())) | (1 2 0) |
| s0 | s2 | ((RUN (2)) (RDY (3 1)) (WAI ())) | (1 2 0) |
| s0 | s4 | ((RUN (3)) (RDY (1 2)) (WAI ())) | (1 2 0) |
| s0 | s10 | ((RUN (2)) (RDY (1 3)) (WAI ())) | (1 2 0) |
| s0 | s14 | ((RUN (3)) (RDY (2 1)) (WAI ())) | (1 2 0) |
| s0 | s15 | ((RUN (1)) (RDY (3 2)) (WAI ())) | (1 2 0) |
| s1 | s1 | ((RUN (2)) (RDY (3)) (WAI (1))) | (1 1 1) |
| s1 | s3 | ((RUN (3)) (RDY (1)) (WAI (2))) | (1 1 1) |
| s1 | s6 | ((RUN (3)) (RDY (2)) (WAI (1))) | (1 1 1) |
| s1 | s7 | ((RUN (1)) (RDY (2)) (WAI (3))) | (1 1 1) |
| s1 | s9 | ((RUN (1)) (RDY (3)) (WAI (2))) | (1 1 1) |
| s1 | s13 | ((RUN (2)) (RDY (1)) (WAI (3))) | (1 1 1) |
| s5 | s5 | ((RUN (3)) (RDY ()) (WAI (1 2))) | (1 0 2) |
| s5 | s8 | ((RUN (1)) (RDY ()) (WAI (2 3))) | (1 0 2) |
| s5 | s11 | ((RUN (2)) (RDY ()) (WAI (1 3))) | (1 0 2) |
| s12 | s12 | ((RUN ()) (RDY ()) (WAI (1 2 3))) | (0 0 3) |

FIG. 34

TABLE 5

| TID | SID0 | SID1 | EVENT | [SID0] | [SID1] |
|---|---|---|---|---|---|
| t0 | s0 | s1 | ((sleep 1) ()) | s0 | s1 |
| t1 | s0 | s2 | ((yield 1) ()) | s0 | s0 |
| t2 | s2 | s3 | ((sleep 2) ()) | s0 | s1 |
| t3 | s2 | s4 | ((yield 2) ()) | s0 | s0 |
| t4 | s1 | s4 | ((wakeup 2 1) ()) | s1 | s0 |
| t5 | s1 | s5 | ((sleep 2) ()) | s1 | s5 |
| t6 | s1 | s6 | ((yield 2) ()) | s1 | s1 |
| t7 | s4 | s7 | ((sleep 3) ()) | s0 | s1 |
| t8 | s4 | s0 | ((yield 3) ()) | s0 | s0 |
| t9 | s3 | s0 | ((wakeup 3 2) ()) | s1 | s0 |
| t10 | s3 | s8 | ((sleep 3) ()) | s1 | s5 |
| t11 | s3 | s9 | ((yield 3) ()) | s1 | s1 |
| t12 | s6 | s10 | ((wakeup 3 1) ()) | s1 | s0 |
| t13 | s6 | s11 | ((sleep 3) ()) | s1 | s5 |
| t14 | s6 | s1 | ((yield 3) ()) | s1 | s1 |
| t15 | s5 | s1 | ((wakeup 3 2) ()) | s5 | s1 |
| t16 | s5 | s9 | ((wakeup 3 1) ()) | s5 | s1 |
| t17 | s5 | s12 | ((sleep 3) ()) | s5 | s12 |
| t18 | s5 | s5 | ((yield 3) ()) | s5 | s5 |
| t19 | s7 | s2 | ((wakeup 1 3) ()) | s1 | s0 |
| t20 | s7 | s11 | ((sleep 1) ()) | s1 | s5 |
| t21 | s7 | s13 | ((yield 1) ()) | s1 | s1 |
| t22 | s9 | s14 | ((wakeup 1 2) ()) | s1 | s0 |
| t23 | s9 | s5 | ((sleep 1) ()) | s1 | s5 |
| t24 | s9 | s3 | ((yield 1) ()) | s1 | s1 |
| t25 | s8 | s3 | ((wakeup 1 3) ()) | s5 | s1 |
| t26 | s8 | s13 | ((wakeup 1 2) ()) | s5 | s1 |
| t27 | s8 | s12 | ((sleep 1) ()) | s5 | s12 |
| t28 | s8 | s8 | ((yield 1) ()) | s5 | s5 |
| t29 | s11 | s6 | ((wakeup 2 3) ()) | s5 | s1 |
| t30 | s11 | s7 | ((wakeup 2 1) ()) | s5 | s1 |
| t31 | s11 | s12 | ((sleep 2) ()) | s5 | s12 |
| t32 | s11 | s11 | ((yield 2) ()) | s5 | s5 |
| t33 | s10 | s9 | ((sleep 2) ()) | s0 | s1 |
| t34 | s10 | s15 | ((yield 2) ()) | s0 | s0 |
| t35 | s13 | s15 | ((wakeup 2 3) ()) | s1 | s0 |
| t36 | s13 | s8 | ((sleep 2) ()) | s1 | s5 |
| t37 | s13 | s7 | ((yield 2) ()) | s1 | s1 |
| t38 | s14 | s13 | ((sleep 3) ()) | s0 | s1 |
| t39 | s14 | s10 | ((yield 3) ()) | s0 | s0 |
| t40 | s15 | s6 | ((sleep 1) ()) | s0 | s1 |
| t41 | s15 | s14 | ((yield 1) ()) | s0 | s0 |

FIG. 35

TABLE 6

| [TID] | TID | SID0 | SID1 | EVENT | [SID0] | [SID1] |
|---|---|---|---|---|---|---|
| t1 | t1 | s0 | s2 | ((yield 1) ()) | s0 | s0 |
| t1 | t3 | s2 | s4 | ((yield 2) ()) | s0 | s0 |
| t1 | t8 | s4 | s0 | ((yield 3) ()) | s0 | s0 |
| t1 | t34 | s10 | s15 | ((yield 2) ()) | s0 | s0 |
| t1 | t39 | s14 | s10 | ((yield 3) ()) | s0 | s0 |
| t1 | t41 | s15 | s14 | ((yield 1) ()) | s0 | s0 |
| t0 | t0 | s0 | s1 | ((sleep 1) ()) | s0 | s1 |
| t0 | t2 | s2 | s3 | ((sleep 2) ()) | s0 | s1 |
| t0 | t7 | s4 | s7 | ((sleep 3) ()) | s0 | s1 |
| t0 | t33 | s10 | s9 | ((sleep 2) ()) | s0 | s1 |
| t0 | t38 | s14 | s13 | ((sleep 3) ()) | s0 | s1 |
| t0 | t40 | s15 | s6 | ((sleep 1) ()) | s0 | s1 |
| t4 | t4 | s1 | s4 | ((wakeup 2 1) ()) | s1 | s0 |
| t4 | t9 | s3 | s0 | ((wakeup 3 2) ()) | s1 | s0 |
| t4 | t12 | s6 | s10 | ((wakeup 3 1) ()) | s1 | s0 |
| t4 | t19 | s7 | s2 | ((wakeup 1 3) ()) | s1 | s0 |
| t4 | t22 | s9 | s14 | ((wakeup 1 2) ()) | s1 | s0 |
| t4 | t35 | s13 | s15 | ((wakeup 2 3) ()) | s1 | s0 |
| t6 | t6 | s1 | s6 | ((yield 2) ()) | s1 | s1 |
| t6 | t11 | s3 | s9 | ((yield 3) ()) | s1 | s1 |
| t6 | t14 | s6 | s1 | ((yield 3) ()) | s1 | s1 |
| t6 | t21 | s7 | s13 | ((yield 1) ()) | s1 | s1 |
| t6 | t24 | s9 | s3 | ((yield 1) ()) | s1 | s1 |
| t6 | t37 | s13 | s7 | ((yield 2) ()) | s1 | s1 |
| t5 | t5 | s1 | s5 | ((sleep 2) ()) | s1 | s5 |
| t5 | t10 | s3 | s8 | ((sleep 3) ()) | s1 | s5 |
| t5 | t13 | s6 | s11 | ((sleep 3) ()) | s1 | s5 |
| t5 | t20 | s7 | s11 | ((sleep 1) ()) | s1 | s5 |
| t5 | t23 | s9 | s5 | ((sleep 1) ()) | s1 | s5 |
| t5 | t26 | s13 | s8 | ((sleep 2) ()) | s1 | s5 |
| t15 | t15 | s5 | s1 | ((wakeup 3 2) ()) | s5 | s1 |
| t15 | t16 | s5 | s9 | ((wakeup 3 1) ()) | s5 | s1 |
| t15 | t25 | s8 | s3 | ((wakeup 1 3) ()) | s5 | s1 |
| t15 | t26 | s8 | s13 | ((wakeup 1 2) ()) | s5 | s1 |
| t15 | t29 | s11 | s6 | ((wakeup 2 3) ()) | s5 | s1 |
| t15 | t30 | s11 | s7 | ((wakeup 2 1) ()) | s5 | s1 |
| t17 | t17 | s5 | s12 | ((sleep 3) ()) | s5 | s12 |
| t17 | t27 | s8 | s12 | ((sleep 1) ()) | s5 | s12 |
| t17 | t31 | s11 | s12 | ((sleep 2) ()) | s5 | s12 |
| t18 | t18 | s5 | s5 | ((yield 3) ()) | s5 | s5 |
| t18 | t28 | s8 | s8 | ((yield 1) ()) | s5 | s5 |
| t18 | t32 | s11 | s11 | ((yield 2) ()) | s5 | s5 |

FIG. 36

TABLE 7

| [TID] | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t17 | s5 | s12 | ((sleep 3) ()) |
| break | | | |
| t0 | s0 | s1 | ((sleep 1) ()) |
| t6 | s1 | s6 | ((yield 2) ()) |
| t5 | s1 | s5 | ((sleep 2) ()) |
| t15 | s5 | s1 | ((wakeup 3 2) ()) |
| t4 | s1 | s4 | ((wakeup 2 1) ()) |
| t1 | s0 | s2 | ((yield 1) ()) |
| break | | | |

FIG. 37

TABLE 8

| [TID] | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t17 | s5 | s12 | ((sleep 3) ()) |
| break | | | |
| t0 | s0 | s1 | ((sleep 1) ()) |
| t6 | s1 | s6 | ((yield 2) ()) |
| t13 | s6 | s11 | ((sleep 3) ()) |
| t29 | s11 | s6 | ((wakeup 2 3) ()) |
| t12 | s6 | s10 | ((wakeup 3 1) ()) |
| t34 | s10 | s15 | ((yield 2) ()) |
| break | | | |

FIG. 38

APPARATUS AND A METHOD FOR GENERATING A TEST CASE

CROSS-REFERENCE TO RELATED APPLICATIONS

This application is based upon and claims the benefit of priority from Japanese Patent Application No. 2009-063281, filed on Mar. 16, 2009; the entire contents of which are incorporated herein by reference.

FIELD OF THE INVENTION

The present invention relates to an apparatus and a method for generating a test case of a system from a specification of the system.

BACKGROUND OF THE INVENTION

At a verification stage of a system development such as a software, from a formal model of a developed object system, a MBT (model-based testing) to automatically generate a test case (verification steps) to verify the system is used. As one of the MBT, from a state-transition system covering states and transitions possible for the system, a method for generating a test case by generating a path according to algorithm of graph theory is well known. By using the test case generated by this method, a test covering state transitions occurred in the system can be performed. Above method is disclosed in following references.

Non-patent reference 1 . . . Harold W. Thimbleby: "The directed Chinese Postman Problem", In Software-Practice and Experience (SPE), Volume 33, pp. 1081-1096, 2003.

Non-patent reference 2 . . . Harold Abelson and Gerald Jay Sussman with Julie Sussman: "Structure and Interpretation of Computer Programs", MIT Press, 1996.

However, the state-transition system includes many similar state-transitions, and a test case acquired from the state-transition system is often redundant. For example, followings are examples of the test case in a task management function of an operating system.

Case 1: At a state "task 1 is waiting", an event "wakeup (task 1)" occurs.

Case 2: At a state "task 2 is waiting", an event "wakeup (task 2)" occurs.

Difference between the cases 1 and 2 is only a task ID. It is sufficient that only one of the cases 1 and 2 is tested according to circumstances. Especially, in development of a large scale system, it is almost impossible that all cases are verified by covering. While coverage for items to be verified is maintained, it is realistic that all cases are suitably sampled and remained cases are tested.

As one solution, as disclosed in JP-A No. 2009-266092 (Kokai), following technique to generate a test case is proposed. Briefly, in this technique, a map for state sets of the state-transition system is given, and an equivalence relation between states is defined by equality of mapped values of the states by the map. Based on the equivalence relation, the state-transition system is previously contracted, and a test case is generated from the contracted state-transition system (quotient state-transition system).

Concretely, in this technique, states in the state-transition system are identified by an equivalence relation of mapped values by a state map indicated by a user. As to the equivalence relation of mapped values by the state map, states having equal output result (equal mapped values) by a state map are identified, and states having different output result (different mapped values) by the state map are not identified. In this case, the state map is a map from a state space.

Then, a plurality of states identified is grouped into one abstract state (one class), and the state-transition system can be small contracted. The abstract state is a virtual state which a plurality of states identified by the equivalence relation is recognized as one state. Furthermore, a test case can be generated to cover each state of the contracted (small) state-transition system at least one time.

FIGS. 3 and 4 are concrete examples by a task management function. In FIG. 3, a state map to output the number of tasks of each task state (RUN, RDY, WAI) is defined. When the number of tasks of each task is equal, these tasks are regarded as an equal state by not distinguishing each task ID. An example of the state-transition system contracted by this state map is shown in FIG. 4. In FIG. 4, the number of state-transition is contracted from 42 to 8.

In above-mentioned method, the state map largely influences a coverage and an efficiency (trade-off relation) of a test case to be output. However, as to a state map to generate the test case satisfying the coverage and the efficiency, there is not a means for reasonably determining the state map.

SUMMARY OF THE INVENTION

The present invention is directed to an apparatus and a method for generating a test case to satisfy a desired coverage and an efficiency by determining a state map.

According to an aspect of the present invention, there is provided an apparatus for generating a test case of a system to be checked, comprising: a first memory configured to store a state-transition system including a plurality of states and a first transition between two of the plurality of states in the system, each state being represented by a plurality of internal variables, the first transition representing a state-change based on an external event occurred into the system; a second memory configured to store a plurality of requirement items each including a precondition and a postcondition in correspondence with the external event, the precondition describing a state of the system before occurrence of the external event, the postcondition describing a state of the system after occurrence of the external event; a state prediction extraction unit configured to select m (m: an integral number equal to or larger than one) requirement items from the second memory, and extract the precondition and the postcondition from the m requirement items; a state map generation unit configured to generate a state map to map an indicated state onto truth values of the precondition and the postcondition; a state equivalence relation definition unit configured to acquire a plurality of mapped values by mapping each of the plurality of states by the state map, and generate a plurality of groups each including states having the same mapped value; a quotient state-transition system generation unit configured to select two groups from the plurality of groups, set a second transition from one of the two groups to the other of the two groups when the first transition from one state included in the one to one state included in the other exists in the state-transition system, and generate a quotient state-transition system including a plurality of second transitions among the plurality of groups by repeating selection of the two groups and set of the second transition; a representative transition path generation unit configured to generate a representative transition path as a sequence of each second transition by tracing the plurality of second transitions from a predetermined group of the plurality of groups; a transition path generation unit configured to select the second transition from the representative transition path in order of the tracing, specify the first transition of which an origin state is same as one state of an origin group of the selected second transition and a destination state of a previous first transition specified, a destination state is same as one state of a destination group of the selected second transition, and generate a test case including a sequence of each first transition specified; and an output unit configured to output the test case.

BRIEF DESCRIPTION OF THE DRAWINGS

FIG. 5 is one example of a requirement item table.

FIG. 6 is one example of an atomic predicate table.

FIG. 9 is one example of a test case acquired from the state-transition system of FIG. 8.

FIG. 11 is one example of a test case acquired from the state-transition system of FIG. 10.

FIG. 12 is one example of a formal requirement item table.

FIG. 13 is one example of a formal atomic predicate table.

FIG. 14 is one example of a state table.

FIG. 15 is one example of a state-transition table.

FIG. 16 is one example of a test case.

FIG. 21 is one example of a test case according to the second embodiment (Step 6).

FIG. 23 is one example of a test case according to the second embodiment (Step 11).

FIG. 31 is a state table (table 1) corresponding to the state-transition system of FIG. 26.

FIG. 32 is a transition table (table 2) corresponding to the state-transition system of FIG. 26.

FIG. 33 is a transition path (table 3) corresponding to the state-transition system of FIG. 26.

FIG. 34 is a state table (table 4) corresponding to the quotient state-transition system as a result of equivalent class of the table 1.

FIG. 35 is a transition table (table 5) corresponding to the quotient state-transition system.

FIG. 36 is a result (table 6) of equivalent class of the transition table of FIG. 35.

FIG. 37 is a representative transition path (table 7) of the quotient state-transition system.

FIG. 38 is a transition path (table 8) on the state-transition of FIG. 26 which is regenerated from the representative transition path.

DETAILED DESCRIPTION OF THE EMBODIMENTS

Figure 1:
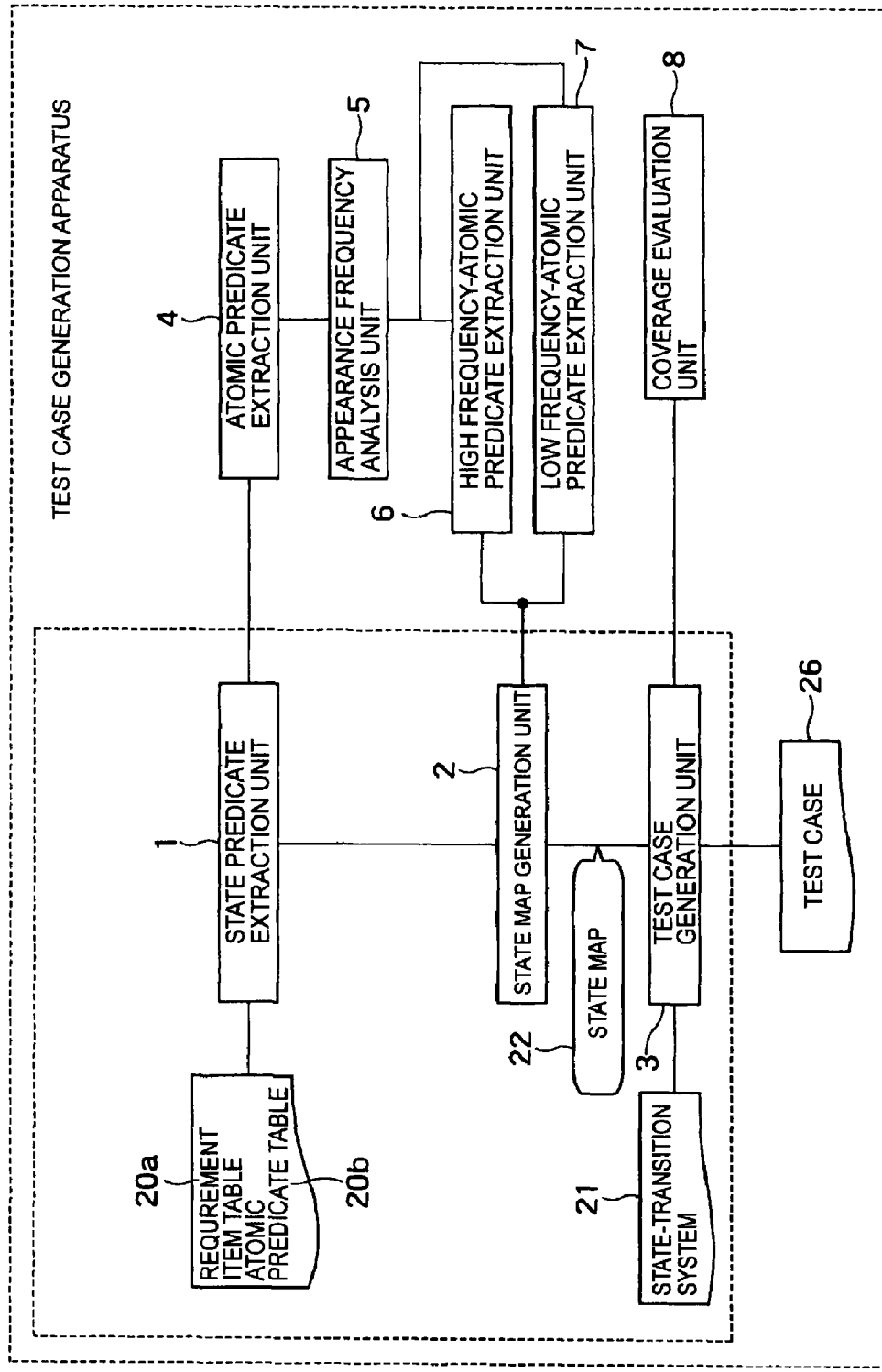
FIG. 1 is a block diagram of a test case generation apparatus according to one embodiment.

Hereinafter, embodiments of the present invention will be explained by referring to the drawings. The present invention is not limited to the following embodiments.

FIG. 1 is a block diagram of a test case generation apparatus according to one embodiment.

<Input of the Test Case Generation Apparatus>

In FIG. 1, the test case generation apparatus accepts input of a specification of a system to be checked. The specification includes a requirement item table (requirement item data) 20a, an atomic predicate table 20b, and a state-transition system 21. The test case generation apparatus includes a first memory means to store the state-transition system 21 (input), a second memory means to store the requirement item table 20a (input) and the atomic predicate table 20b (input), and a read-out means to read data from the first and second memory means.

The State-Transition System:

In the system to be checked, internal processing is executed with occurrence of an external event, and an internal state is changing hourly. The state-transition system is composed by states possible for the system to be checked, and transitions (first transitions) representing a state change of the system based on the external event occurred for the system (Refer to FIG. 7 explained afterwards). A state of the system is represented by a group of a plurality of interval variables.

The Requirement Item Table:

As to an external event (In order to simplify, it is often called "event"), a condition related to an internal state to accept occurrence of the event, and a condition related to change of the internal state after internal processing, are prescribed. The former condition is called "precondition", and the latter condition is called "postcondition". Briefly, the precondition is a condition of a state required for the system before occurrence of the event, and the postcondition is a condition of a state required for the system after occurrence of the event. The precondition and the postcondition are described as a state predicate. The event, the precondition and the post condition, are called "requirement item". The requirement item is prescribed with each event. A table format listing these items is a requirement item table (Refer to FIG. 5 explained afterwards). The requirement item is a condition of a behavior that a designer requires the system. In other words, the condition of the behavior is an item to be verified after development of the system.

The Atomic Predicate Table:

The atomic predicate table is a table of atomic predicates composing state predicates of the precondition and the postcondition in the requirement item table (Refer to FIG. 6 explained afterwards). The atomic predicate is described as a condition related to a value of one internal variable.

<Output of the Test Case Generation Apparatus>

Test Case:

In FIG. 1, the test case generation apparatus outputs a test case 26 of the system to be checked. The test case is a list including operation steps (event sequence) to test the system to be checked and an expected value (state-transition sequence) as a test result of the system to be checked by the operation steps. The test case generation apparatus includes an output means for outputting the test case 26.

<Explanation of Subject: Cruise Controller>

Before detail-explanation of the test case generation apparatus in FIG. 1, a subject processed in the present embodiment is explained.

In the present embodiment, a simplified one of a cruise controller (or a cruise control system) is the system to be checked. By using the simplified one as the subject, the present invention is explained. The cruise control system is one kind of vehicle control system which automatically preserves a constant velocity without stepping an access pedal.

Internal Variable:

The cruise controller has three internal variables.

Velocity (variable name "vel")

Light status of a cruise lamp (variable name "cruise")

Light status of a set lamp (variable "set")

External Event:

The cruise controller accepts four kinds of external events. The internal processing is executed with occurrence of the external event, and values of the internal variables are changing hourly. Accordingly, an internal state of the cruise controller also changes.

Accelerator (event name "Accel")

Brake (event name "Brake")

Cruise switch (event name "Cruise")

Set switch (event name "Set")

The requirement item table and the atomic predicate table:

FIG. 5 is the requirement item table of the cruise controller, and FIG. 6 is the atomic predicate table of the cruise controller. For example, a requirement item 1 is a requirement related to event processing of an event "cruise switch: ON". A precondition is "P1∧ ]P2∧ ]P3", i.e. , "velocity is equal to or larger than 40 km/h, and the cruise lamp and the set lamp are not lighting". A postcondition is "P2", i.e., "the cruise lamp is lighting". As to the cruise controller, this event is accepted when the internal state satisfies the precondition, and the postcondition is always satisfied after the event processing.

Figure 7:
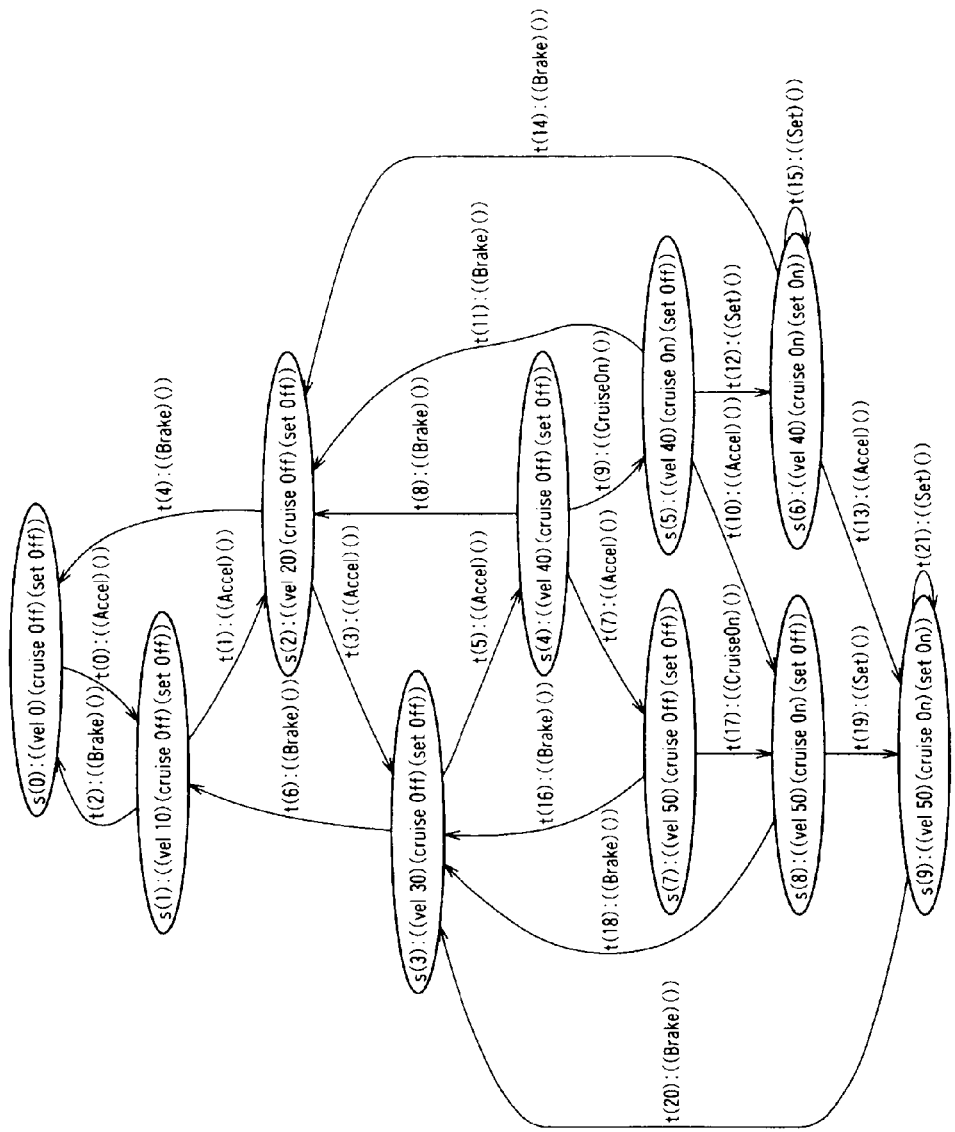
FIG. 7 is one example of the state-transition system.

The State-Transition System:

FIG. 7 is a state-transition system (the number of states: 10, the number of state-transitions: 22) of the cruise controller. For example, a state 4 (i.e., s(4)) is a state of the internal variable which vel (velocity) is 40, cruise (cruise lamp) is OFF, and set (set lamp) is OFF. A state-transition 9 is a transition corresponding to internal processing by the external event "cruise switch: ON". When this external event occurs at the state 4, the state 4 is changed to the state 5 by the state-transition 9.

<Simple Concrete Example>

As to a construction of a state map and a scale reduction of the test case by the state map, an example which the cruise controller is further simplified is explained. In this example, the requirement item is limited to an item 1 (the number of requirement items m=1) in FIG. 5, and the state-transition system is simplified as shown in FIG. 8.

Figure 8:
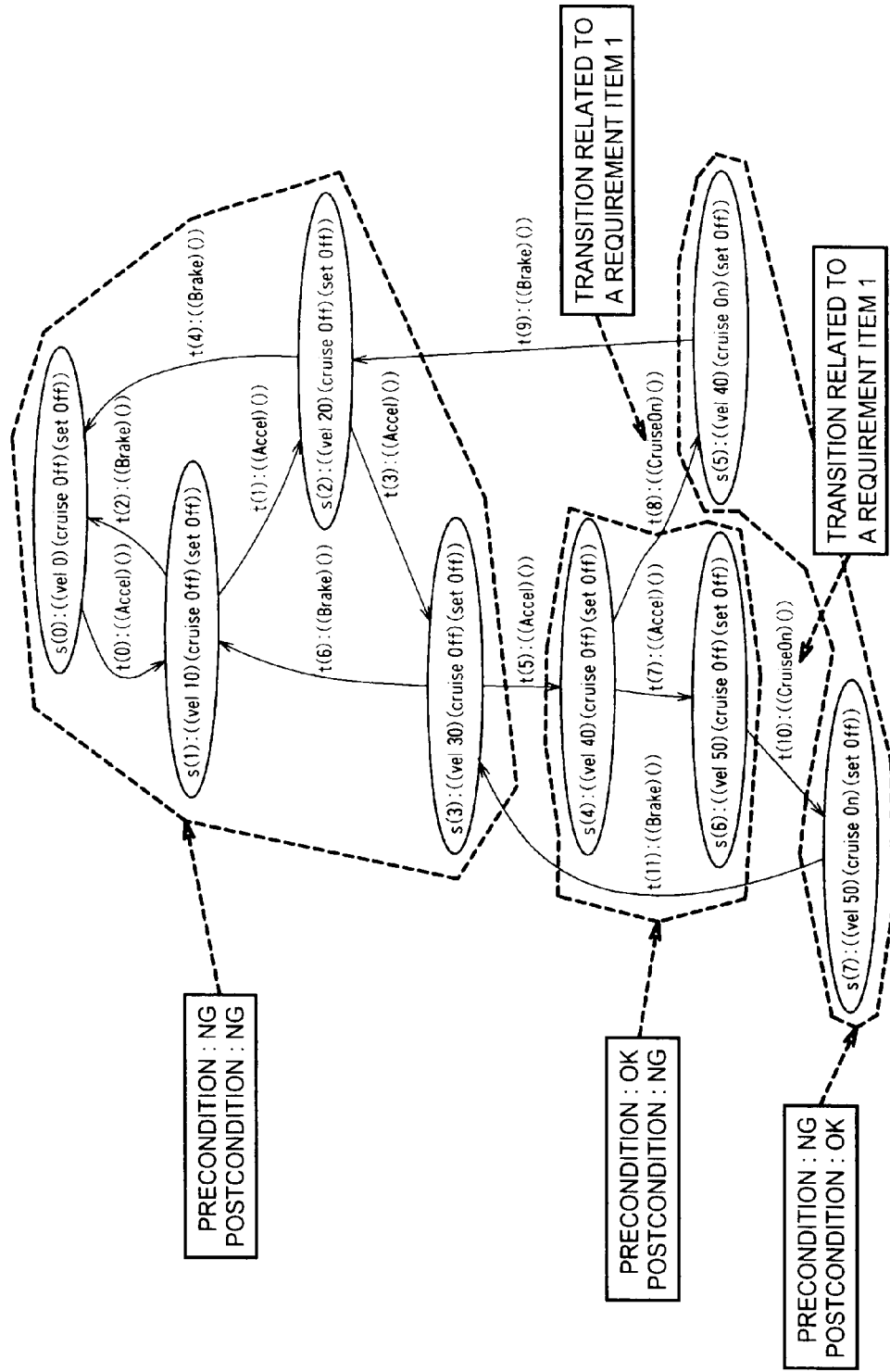
FIG. 8 is one example of a simplified state-transition system.

In the state transition system of FIG. 8, states satisfying a precondition of the requirement item 1 are two states 4 and 6. State-transitions as a test of the requirement item 1 are state-transitions 8 and 10 as an event "cruise switch: ON" from the states 4 and 6. Each state-transition reaches a state 5 or 7, which satisfies the postcondition of the requirement item 1. Other state-transitions (except for the state-transitions 8 and 10) are not related with a test of the requirement item 1.

From this state-transition system, a test case is generated so that all state-transitions are covered at least one time. FIG. 9 is the test case (16 transitions) generated. This test case includes above-mentioned two state-transitions and covers all requirement items (In this example, item 1 only). However, this test case includes two state-transitions 8 and 10 having the same precondition and the same postcondition, and includes fourteen state-transitions unrelated with the test of the requirement item. Accordingly, this test case is open to discussion for improvement of efficiency.

Accordingly, in the present embodiment, in order to acquire an effective test case satisfying a coverage criteria (a criteria which determines a ratio or the number of requirement items to be covered in all requirement items), a function to output a combination of satisfiability (truth value) of the precondition and the postcondition is composed as a state map. For example, a state 4 satisfies the precondition but does not satisfy the postcondition. Accordingly, a mapping result (mapped value) of the state 4 by the state map is (OK, NG). As to (OK, NG), the left element corresponds to satisfiability (truth value) of the precondition, and the right element corresponds to satisfiability (truth value) of the postcondition. "OK" corresponds to truth and "NG" corresponds to false. On the other hand, a state 5 satisfies the postcondition but does not satisfy the precondition. Accordingly, a mapping result (mapped value) of the state 5 by the state map is (NG, OK).

Figure 10:
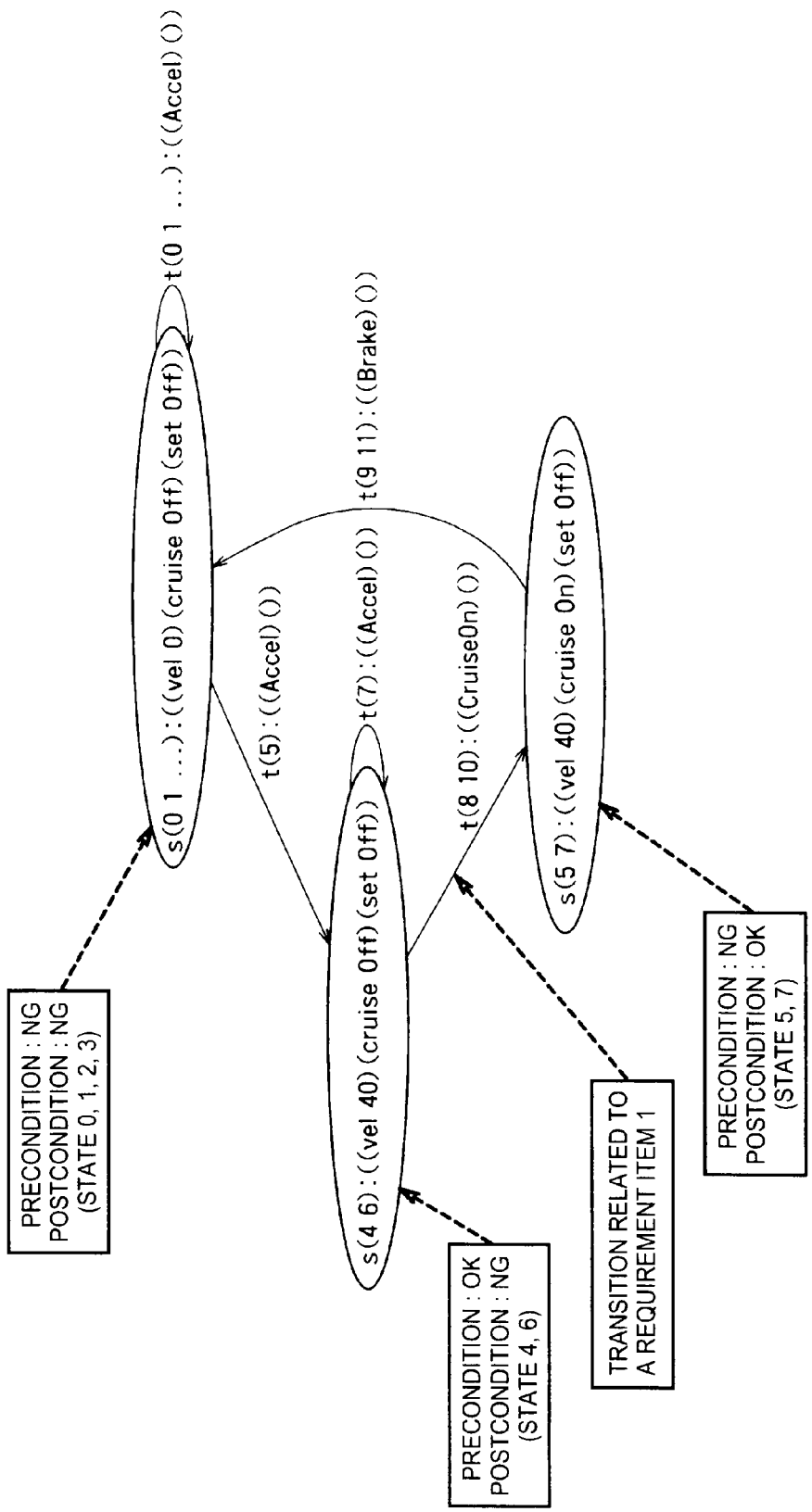
FIG. 10 is a schematic diagram of a state-transition system contracted from the state-transition system of FIG. 8.

FIG. 10 is a contraction result of the state-transition system of FIG. 8 by the state map. Identical example by the state map is explained as a concrete example. For example, in the same way as the state 4, an output result of the state 6 by the state map is (OK, NG), and the states 4 and 6 are identified. On the other hand, an output result of the state 5 by the state map is different from an output result of the state 4. Accordingly, the states 4 and 5 are not identified. By this identifying, a plurality of states is contracted as one abstract state by satisfiability of the precondition and the postcondition. For example, the state satisfying not the postcondition but the precondition is states 4 and 6, and each mapping result of states 4 and 6 by the state map is (OK, NG). Accordingly, these states 4 and 6 are contracted as one abstract state and identified. In the same way, the state satisfying not the precondition but the postcondition is states 5 and 7, and each mapping result of states 5 and 7 by the state map is (NG, OK). Accordingly, these states 5 and 7 are contracted as one abstract state and identified. Furthermore, the state not satisfying both the precondition and the postcondition is states 0, 1, 2, 3, and each mapping result of the states 0, 1, 2, 3 by the state map is (NG, NG). Accordingly, these states 0, 1, 2, 3 are contracted as one abstract state and identified. By this state contraction, state-transitions 9 and 10 corresponding to the test are contracted as one transition.

From this contracted state transition system, a test case is generated so that all state transitions are covered at least one time as usual. FIG. 11 is a generated test case (seven transitions). In FIG. 11, state-transitions 8 and 10 corresponding to the test are contracted as one transition. As a result, an effective test case of which scale is reduced within a range satisfying the coverage criteria can be generated.

The above-mentioned is explanation of construction example of the state map to generate an effective test case satisfying the prefixed coverage criteria, and effect of size-reduction of the test case.

<Construction Method of the State Map>

In a previous paragraph, a concrete example of construction method of the state map by limiting the requirement item as one is explained. This method can be extended to a general case that a plurality of requirement items is covered. In order to generate an effective test case covering the plurality of requirement items, it is sufficient that a state map to output combination of satisfiability (truth value) of the precondition and the postcondition of all requirement items is constructed. This is called "construction method 1" (corresponding to a first embodiment explained afterwards).

For example, in case of two requirement items, a state map is "(satisfiability of precondition of requirement item 1, satisfiability of postcondition of requirement item 1, satisfiability of precondition of requirement item 2, satisfiability of postcondition of requirement item 2)". A state-transition system contracted by the state map includes eight abstract states of which mapped value is (OK, *, *, *), and also includes eight abstract states of which mapped value is (*, *, OK, *). In this case, "*" means both OK (truth) and NG (false). The former (OK, *, *, *) is a state satisfying the precondition of the requirement item 1, and the latter (*, *, OK, *) is a state satisfying the precondition of the requirement item 2.

Accordingly, a test case generated from this contracted state-transition system satisfies the coverage criteria (In this case, all requirements need be covered) related to two requirement items. On the other hand, the state-transition system is contracted. Accordingly, in comparison with the case of non-contraction, a size of the test case can be reduced.

However, the construction method 1 has a possibility of explosion of the size of the test case with increase of the number of requirement items. Because, in proportion to increase of the precondition and the postcondition composing the state map, the number of states of the contracted state-transition system exponentially increases. As explained as the example in the previous paragraph, in case of composing the state map from the precondition and the post condition of one requirement item, the contracted state-transition system includes at most four states. However, in case of two requirement items, the contracted state-transition system includes sixteen states at the maximum.

Accordingly, in order to improve efficiency, another construction method ("construction method 2" corresponding to a second embodiment explained afterwards) can be considered. In this method, first, all atomic predicates included in each requirement item is extracted, an appearance frequency of each atomic predicate is calculated, and a state map is composed by an atomic predicate having the largest appearance frequency. A state-transition system is contracted by the state map, and a test case is generated and evaluated. If the test case does not satisfy a coverage criteria, an atomic predicate having the second largest appearance frequency is added to the state map, and generation and evaluation of the test case are executed again. This processing is repeated until the test case satisfies the coverage criteria. This is slightly a heuristic method. However, whenever the atomic predicate is added, at least the coverage of the test case (a ratio or the number of requirement items covered by the test case) monotonously increases, and the test case finally satisfies the coverage criteria. The reason why the coverage of the test case monotonously increases by adding the atomic predicate to the state map is that, the abstract state is detailed by adding the atomic predicate. Briefly, by detailing one state-transition contracted, more detail test case can be acquired. Accordingly, at least coverage of the test case monotonously increases.

Furthermore, "a construction method 3" (corresponding to a third embodiment explained afterwards) as the reverse idea of the construction method 2 can be considered. First, a state map is constructed by all atomic predicates appeared in each requirement item. A state-transition system is contracted by the state map, and a test case is generated and evaluated. If the test case satisfies the coverage criteria, an atomic predicate having the smallest appearance frequency is excluded from the state map, and generation and evaluation of a test case are repeated while the test case satisfies the coverage criteria. By this method, the test case having high efficiency (satisfying the coverage criteria) can be generated.

[The First Embodiment]

Apparatus component of the first embodiment corresponds to a part surrounded by an inside dotted line in FIG. 1. All apparatus surrounded by an outside dotted line is a component related to the second and third embodiments explained afterwards. Component of a part surrounded by the inside dotted line includes a state predicate extraction unit 1, a state map generation unit 2, a test case generation unit 3, a first memory to store a state-transition system 21, a second memory to store a requirement item table 20a and an atomic predicate table 20b, and an output unit to output a test vase 26. Hereinafter, the first embodiment is explained in detail.

1. Summary of the Apparatus

A state-transition system composed by states and state-transitions (each possible for a system to be checked) is previously prepared. Furthermore, as a combination of an external event of the system, a precondition and postcondition expected for the system, a plurality of requirement items (formally expressed) for the system is prepared. Among the plurality of requirement items, a state map is constructed by calculating a direct product of state predicates described in the precondition and the postcondition of a selected requirement item.

Furthermore, by using a method of a fourth embodiment (test case generation apparatus and method disclosed in JP-A No. 2009-266092 (Kokai)) explained afterwards, the state-transition system 21 is contracted with the state map, and the test vase 26 is generated so that all state-transitions of the contracted state-transition system (quotient state-transition system) are covered.

2. Input/Output of the Apparatus

Input of the apparatus is a specification of the system to be checked. The specification comprises the requirement item table 20a, the atomic predicate table 20b, and the state-transition system 21. Output of the apparatus is the test case 26.

The Requirement Item Table and the Atomic Predicate Table:

Each requirement item of the requirement item table 20a shown in FIG. 12 and each atomic predicate of the atomic predicate table 20b shown in FIG. 13, are formally described so that the computer can interpret. These are expressed as a function of programming language Scheme (Non-patent reference 2). Briefly, as to this function, a state is input and satisfiability (truth value) is output. Moreover, requirement items in FIG. 12 are same as those in FIG. 5, and atomic predicates in FIG. 13 are same as those in FIG. 6.

The State-Transition System:

The state-transition system 21 is expressed as a state table shown in FIG. 14 and a state-transition table shown in FIG. 15. An initial state is a state 0. The state table (FIG. 14) represents an identifier (SID: State ID) of each state and contents (state). The state-transition table (FIG. 15) represents an identifier (TID: Transition ID) of each transition, an identifier (SID0) of an origin state, an identifier (SID1) of a destination state, and contents (external event) of the transition.

For example, a state (SID) 4 of the state table means internal variables such as vel (velocity) "40", cruise (cruise lamp) "OFF", and set (set lamp) "OFF". Furthermore, a state-transition (TID) 9 of the state-transition table is a transition corresponding to internal processing by an external event "CruiseOn", and transits from a state 4 to a state 5.

The Test Case:

FIG. 16 is one example of the test case output from this apparatus. The test case is represented by continuous transitions of fifteen times starting from the initial state.

3. Flow of Processing

Processing flow of the apparatus is explained.

3.1 All of the Apparatus

Figure 17:
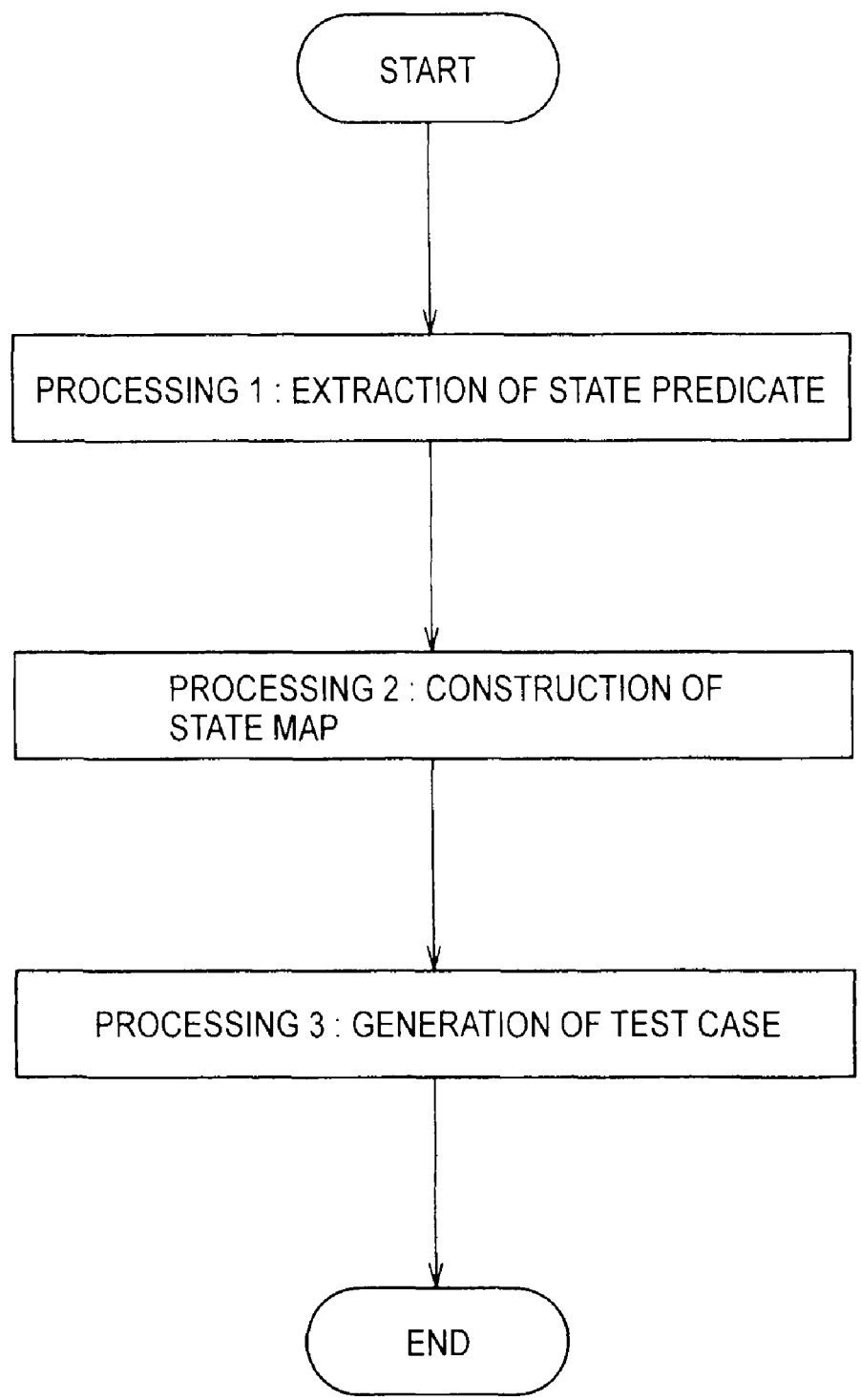
FIG. 17 is a flow chart of all processing of the test case generation apparatus according to a first embodiment.

FIG. 17 is a flow chart of all processing of the apparatus.

Processing 1: Extraction of State Predicate

Processing: State predicates described as the precondition and the postcondition in the requirement item table 20*a* are extracted. All requirement items in the requirement item table 20*a* may be an extraction object, or a plurality of requirement items selected may be the extraction object. For example, in FIG. 12, two requirement items exist. In this case, one requirement item (m=1) or two requirement items (m=2) is the extraction object.

Input: The requirement item table 20*a*

Output: The state predicate

Processing means: "The state predicate extraction unit 1"

Processing 2: Construction of the State Map

Processing: By calculating a direct product of formal state predicates (precondition and postcondition) extracted, the state map 22 is composed.

Input: The state predicate (Precondition and postcondition)

Output: The state map 22

Processing means: "The state map generation unit 2"

Processing 3: Generation of the test case (Detail of generation method is explained in the fourth embodiment afterwards)

Processing: The state-transition system 21 is contracted by the state map 22, and a path covering all state-transitions of the contracted state-transition system (quotient state-transition system) is generated as the test case 26.

Input: The state-transition system 21, the state map 22

Output: The test case 26

Processing means: "The test case generation unit 3"

3.3 Processing 1

State predicates described as the precondition and the postcondition in the requirement item table 20*a* are extracted. If the state predicate is not an atomic predicate, a predicate name is acquired by analyzing a character string defined as the state predicate. For example, in FIG. 12 (requirement item table), "(define (P1notP2notP3 s) (and (P1 s) (not (P2 s)) (not (P3 s))))" is definition of the state predicate. The state predicate name is "P1notP2notP3".

3.3 Processing 2

From state predicates extracted at the processing 1, a state map is constructed as a function to output satisfiability of each state predicate by a list format. Assume that state predicates F1, F2, . . . , Fn (n-units) are state predicates extracted at the processing 1. In this case, as to state s, a function to output a list ((F1 s), (F2 s), . . . , (Fn S)) is defined as the state map. This (F1 s) represents a result which the predicate F1 is applied to the state s, i.e., satisfiability (truth value) of the predicate F1. This state map is described as "(define (stateFunc s) (list (F1 s) (F2 s) . . . (Fn s)))".

4. Concrete Example

Hereinafter, a concrete example of the processing explained at "3. Flow of processing" is shown.

Step 1 (Processing 1: Extraction of State Predicates)

Output: State predicates "P1notP2notP3", "P2", "P3" (In this case, all requirement items (m=2) in all requirement item table are object)

Step 2 (Processing 2: Construction of the State Map)

Output: State map "(define (fun s) (list(P1notP2notP3 s) (P2 s) (P3 s)))"

Step 3 (Processing 3: Generation of Test Case)

Output: The test case (FIG. 16)

Figure 18:
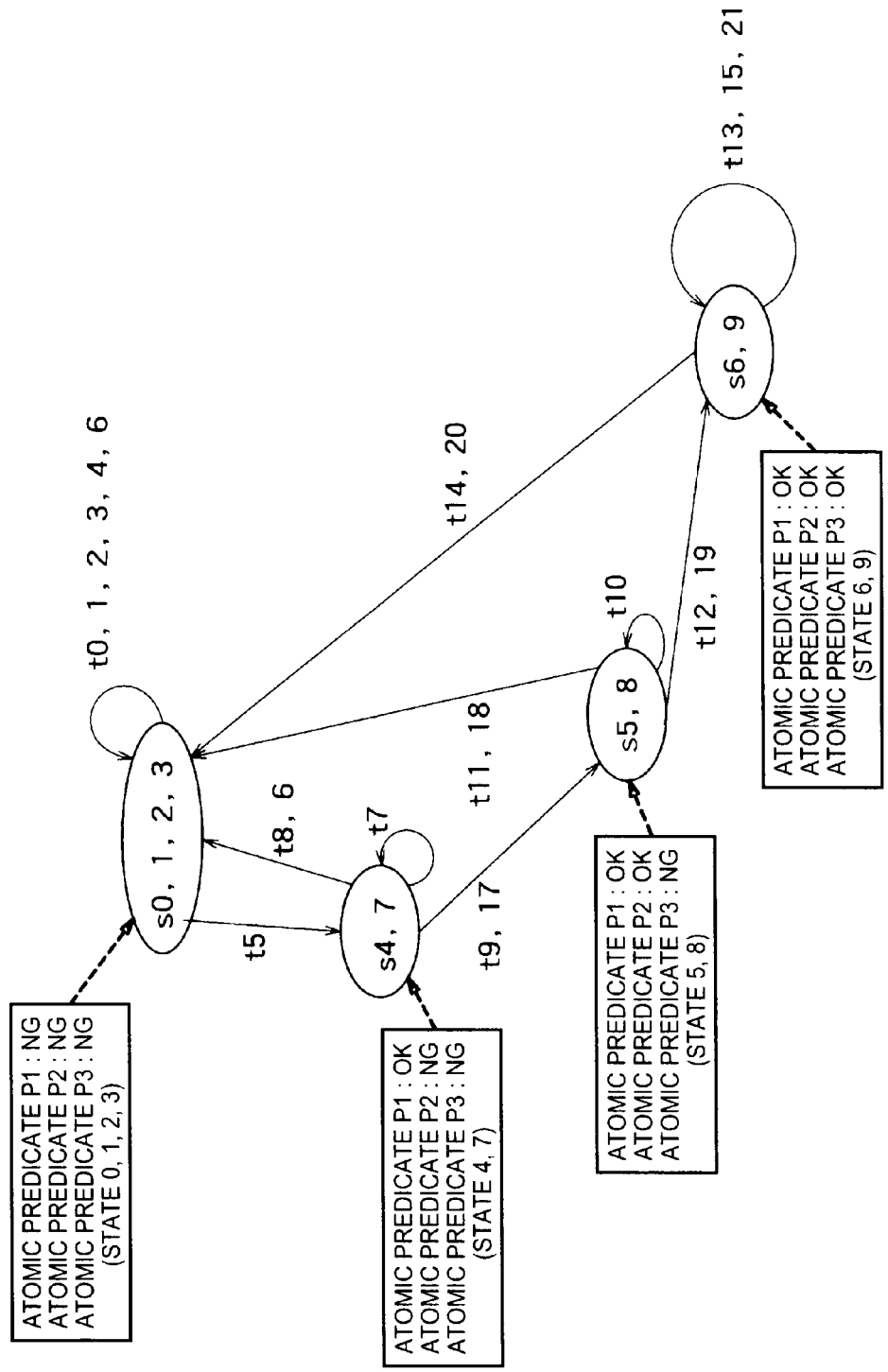
FIG. 18 is a schematic diagram of a contracted state-transition system according to the first embodiment (Step 3).

(A contracted state-transition system as intermediate date is shown in FIG. 18)

[The Second Embodiment]

Apparatus component of the second embodiment corresponds to a part (except for the unit 7) surrounded by an outside broken line in FIG. 1. As to the component of the second embodiment, units 4~6 and 8 are added to the component of the first embodiment. Briefly, the component of the second embodiment includes the state predicate extraction unit 1, the state map generation unit 2, the test case generation unit 3, the first memory to store the state-transition system 21, the second memory to store the requirement item table 20*a* and the atomic predicate table 20*b*, the output unit to output the test case 26, an atomic predicate extraction unit 4, an appearance frequency analysis unit 5, a high frequency-atomic predicate extraction unit 6, and a coverage evaluation unit 8.

1. Summary of Apparatus

Based on the first embodiment, a method for constructing the state map is extended. As to the method for constructing a state map according to the second embodiment, an atomic predicate having the highest appearance frequency is first selected from a set of state predicates extracted from each requirement item. Operation which each atomic predicate is added to the state map (a direct product with the state map) in higher order of the appearance frequency is repeated until a test case (generated by the state map) satisfies the coverage criteria.

2. Input/Output of Apparatus

Input/output of the apparatus of the second embodiment are same as those of the first embodiment.

3. Flow of Processing

Figure 19:
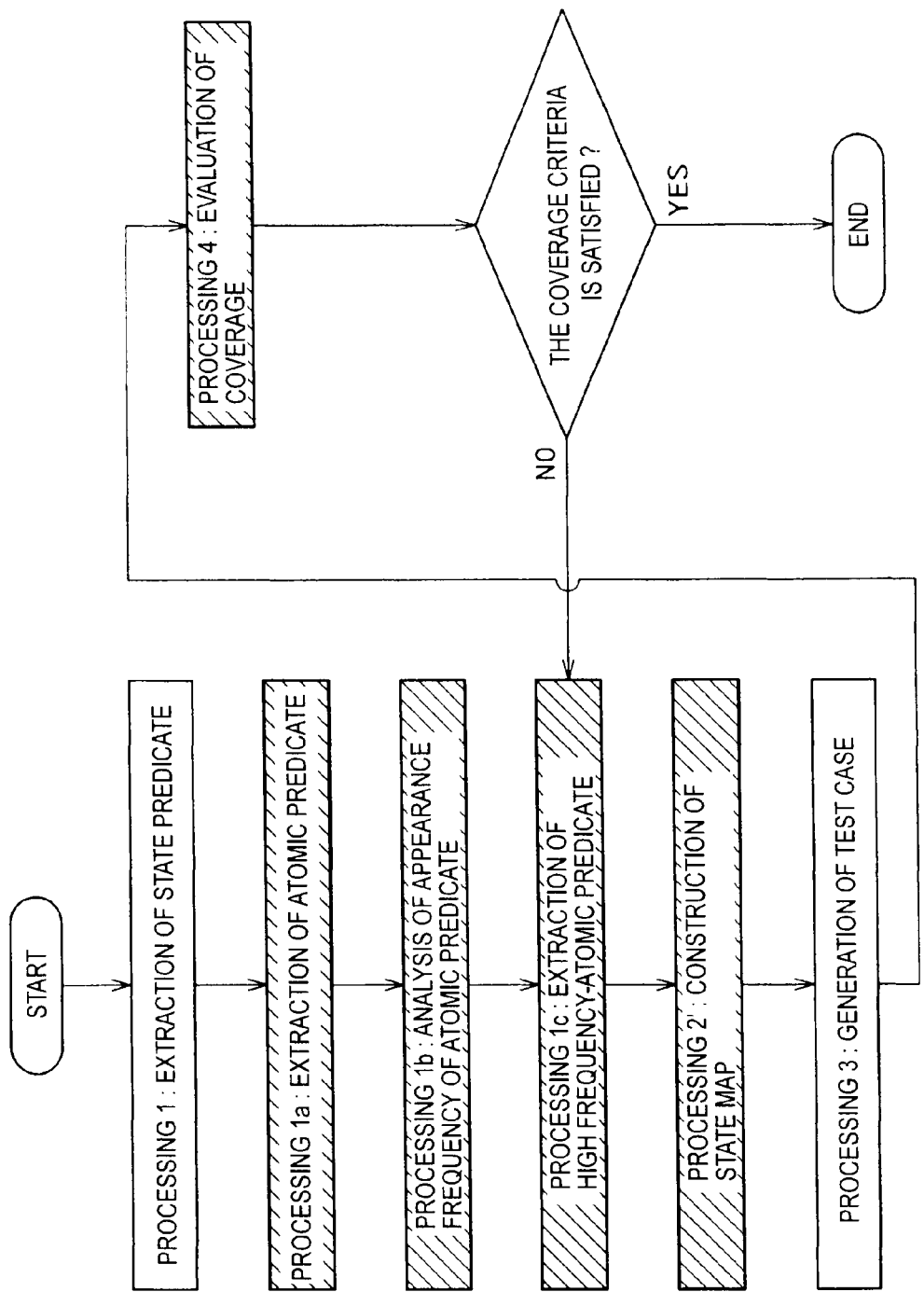
FIG. 19 is a flow chart of all processing of the test case generation apparatus according to a second embodiment.

Flow of processing of the apparatus is explained. FIG. 19 is a flow chart of processing of the apparatus. The second embodiment is extended from the first embodiment, and parts different from the first embodiment are shown as oblique line blocks in the flow chart. Hereinafter, different parts from the first embodiment are mainly explained.

Processing 1*a*: Extraction of Atomic Predicate

Processing: Atomic predicates are extracted from the state predicate table.

Input: The state predicate table (a set of state predicate extracted by the state predicate extraction unit 1)

Output: The atomic predicate list

Processing means: "The atomic predicate extraction unit 4"

Processing 1*b*: Analysis of appearance frequency of atomic predicates

Processing: As to each atomic predicate extracted at the processing 1*a*, appearance frequency of each atomic predicate in a set of all state predicates is analyzed.

Input: The atomic predicate list

Output: A list of appearance frequency order of atomic predicates

Processing means: "The appearance frequency analysis unit 5"

Processing 1*c*: Extraction of high frequency-atomic predicate

Processing: An atomic predicate having the highest appearance frequency is extracted from the list of appearance frequency order acquired at the processing 1b Input: The list of appearance frequency order of atomic predicates Output: (High appearance frequency) atomic predicate Processing means: "The high frequency-atomic predicate extraction unit 6"

Processing 2': Construction of the state map

Processing: If the state map is not constructed yet, the atomic predicate extracted at the processing 1c is regarded as the state map. If the state map is already constructed, the state map is constructed by a direct product of atomic predicates extracted at the processing 1c. The direct product is calculated in the same way as the first embodiment.

Input: The atomic predicate, the state map

Output: The state map

Processing means: "The state map generation unit 2"

Processing 4: Evaluation of coverage

Processing: As to a test case generated at the processing 3, coverage (a ratio or the number of requirement items covered by the test case) for requirement items is evaluated. Concretely, as to each requirement item selected at the processing 1, by using a formal state predicate acquired by formatting state predicates of the precondition and the post condition of the requirement item, it is retrieved whether a state-transition (an origin state satisfies the precondition and a destination state satisfies the post condition) exists in the test case. If the state-condition exists, the state-transition is one step corresponding to verification of a requirement item in the test case. Accordingly, it is evaluated that the requirement item is covered by the test case. By repeating this processing for all requirement items, evaluation of coverage is performed, and the coverage (a ratio or the number of requirement items covered by the test case) is acquired.

Input: The test case 26

Output: The coverage of the test case

Processing means: "The coverage evaluation unit 26"

4. Concrete Examples

Hereinafter, concrete examples of processing explained at "3. Flow of processing" are shown.

Step 1 (Processing 1: Extraction of state predicate)

Output: State predicates "P1notP2notP3", "P2", "P3"

Step 2 (Processing 1a: Extraction of atomic predicate)

Output: The list of atomic predicates "P1, P2, P3"

Step 3 (Processing 1b: Analysis of appearance frequency of atomic predicates)

Output: The list of appearance frequency order of atomic predicates "P2, P3, P1" (As to a list of atomic predicates acquired at Step 2, appearance frequency of each atomic predicate in a set of state predicates is calculated, and each atomic predicate is sorted in order of appearance frequency. P2 has the highest appearance frequency.)

Step 4 (Processing 1c: Extraction of high frequency-atomic predicate)

Output: An atomic predicate "P2" (The atomic predicate having the highest appearance frequency is extracted from the list of appearance frequency acquired at Step 3. At the same time, "P2" is deleted from the list of appearance frequency.)

Step 5: (Processing 2': Construction of the state map)

Output: The state map "P2" (The state map does not exist at the present time. Accordingly, an atomic predicate extracted at Step 4 is regarded as the state map)

Step 6: (Processing 3: Generation of test case)

Output: A test case (FIG. 21) (A size of the test case: 7)

Figure 20:
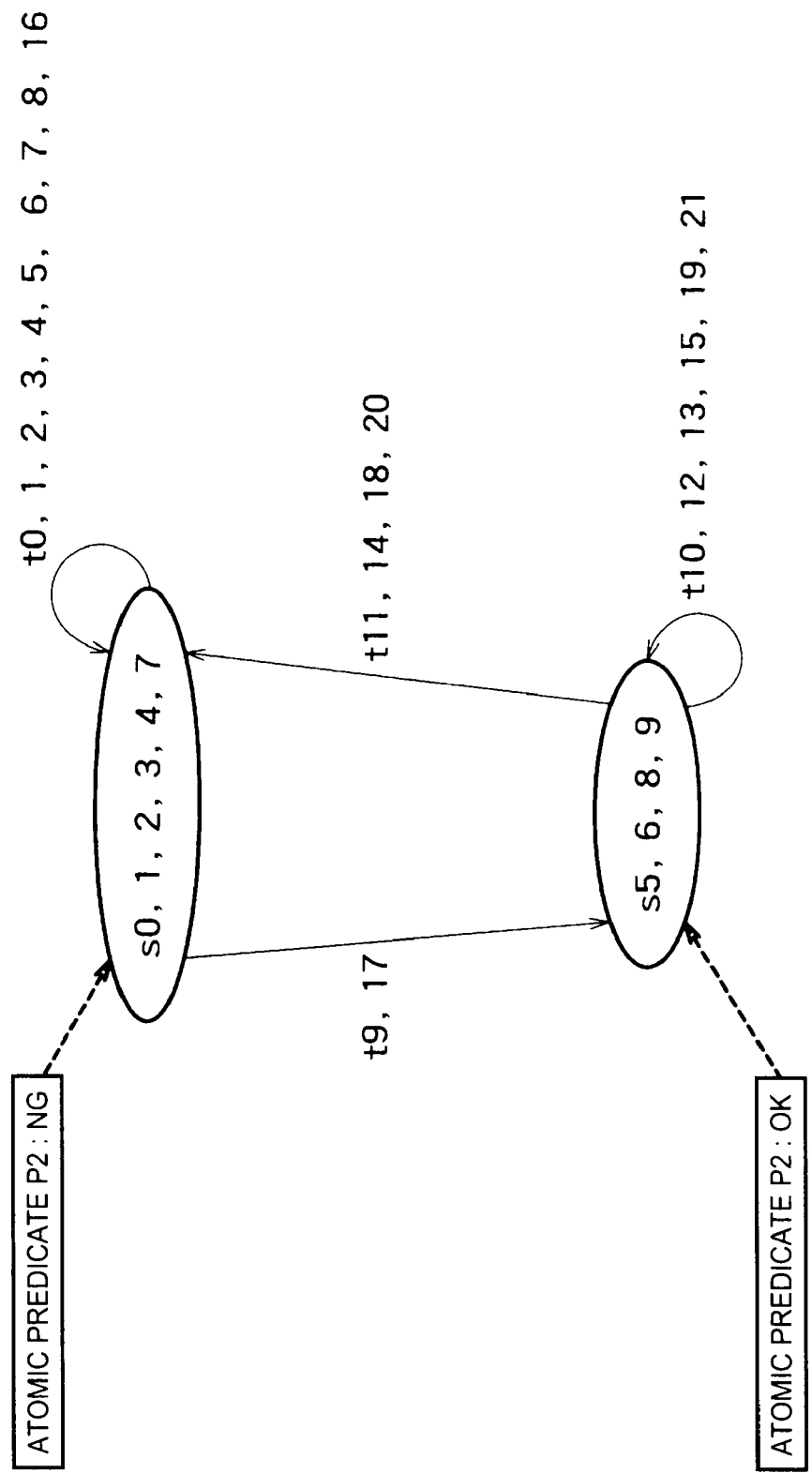
FIG. 20 is a schematic diagram of a contracted state-transition system according to the second embodiment (Step 6).

(The contracted state-transition system as intermediate data is shown in FIG. 20 (the number of states: 2, the number of state-transitions: 4))

Step 7: (Processing 4: Evaluation of coverage)

Output: The coverage 50%

The requirement item 1 is covered by a state-transition 9, but the requirement item 2 is not covered.

Step 8 (Condition branch: coverage)

Output: No (The coverage does not satisfy a criteria. In this case, the criteria is 100%.)

Step 9: (Processing 1c: Extraction of high frequency-atomic predicate)

Output: An atomic predicate "P3" (The atomic predicate having the second highest appearance frequency is extracted from the list of appearance frequency. At the same time, "P3" is deleted from the list of appearance frequency.)

Step 10: (Processing 2': Construction of the state map)

Output: The state map "(define (stateFunc s) (list (P2 s) (P3 s)))" (The state map "P2" already exists. Accordingly, "P2" and "P3" are calculated as a direct product.)

Step 11 (Processing 3: Generation of the test case)

Output: The test case (FIG. 23) (A size of the test case: 11)

Figure 22:
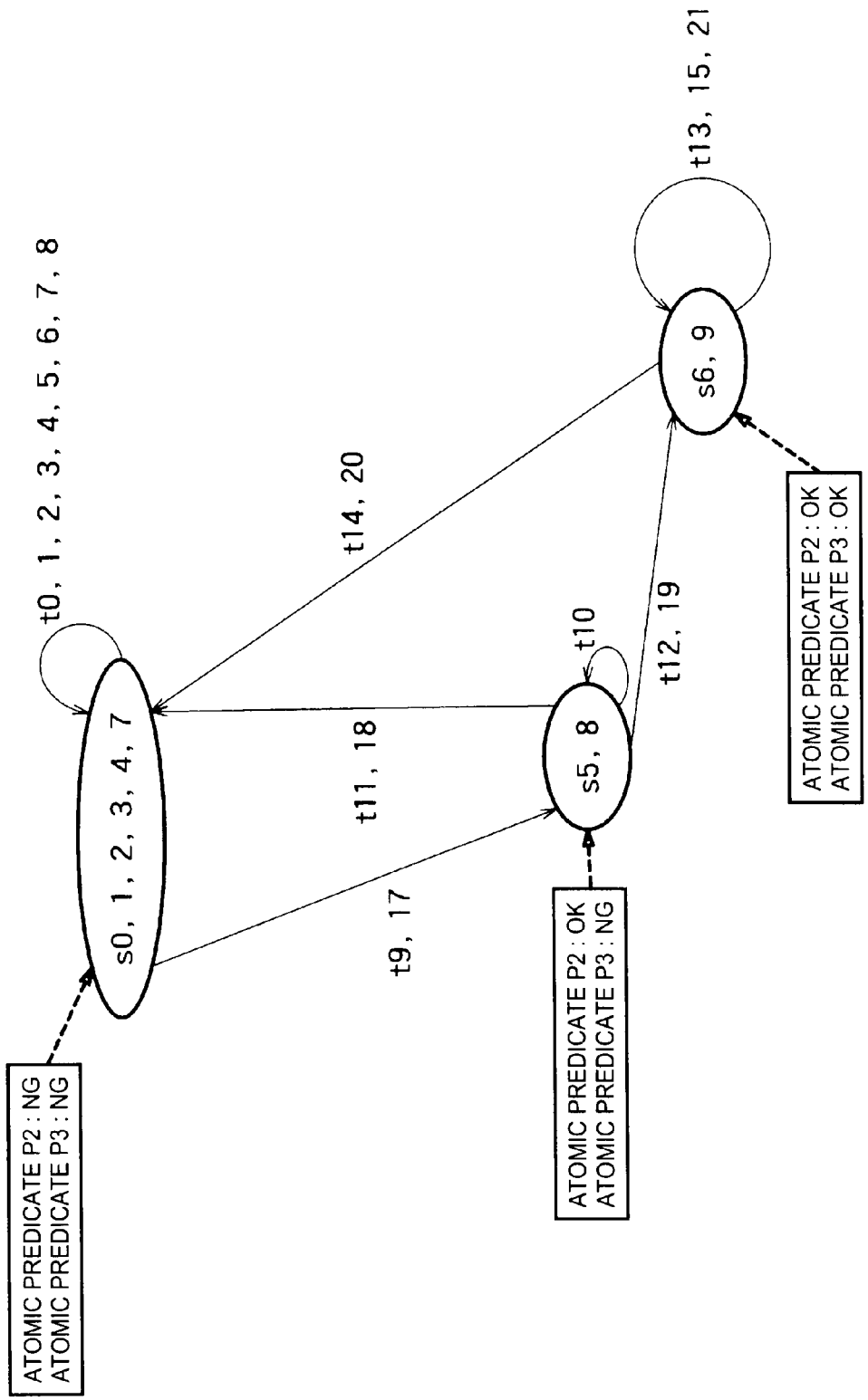
FIG. 22 is a schematic diagram of a contracted state-transition system according to the second embodiment (Step 11).

(The contracted state-transition system as intermediate data is shown in FIG. 22 (the number of states: 3, the number of state-transitions: 7)

Step 12: (Processing 7: Evaluation of coverage)

Output: The coverage 100%

The requirement item 1 is covered by a state-transition 9, and the requirement item 2 is covered by a state-transition 12.

Step 13 (Condition branch: coverage)

Output: Yes

Step 14 (Completion)

Output: The test case acquired at Step 12 (Processing is completed because the coverage criteria is satisfied.)

[The Third Embodiment]

Apparatus component of the third embodiment corresponds to a part (except for the unit 6) surrounded by an outside broken line in FIG. 1. As to the component of the second embodiment, the unit 6 is deleted from and the unit 7 is added to the component of the second embodiment. Briefly, the component of the third embodiment includes the state predicate extraction unit 1, the state map generation unit 2, the test case generation unit 3, the first memory to store the state-transition system 21, the second memory to store the requirement item table 20a and the atomic predicate table 20b, the output unit to output the test case 26, the atomic predicate extraction unit 4, an appearance frequency analysis unit 5, a low frequency-atomic predicate extraction unit 7, and the coverage evaluation unit 8. As to each unit having the same name used in the second embodiment, its operation is basically same as that of the second embodiment. However, processing of the state map generation unit 2 is partially different.

1. Summary of the Apparatus

As to the method for constructing a state map according to the third embodiment, a state map (maximum set) is first calculated as a direct product of all atomic predicates in requirement items. While a test case (generated by the state map) is covering the requirement items, operation which an atomic predicate is deleted from the state map in lower order of the appearance frequency is repeated.

Briefly, by adaptively selecting all atomic predicates, the state map as a direct product of atomic predicates of selected h-units (h: integral number equal to or larger than 1) is generated so that the coverage satisfies the criteria. This operation is same as the second embodiment. However, in the second embodiment, the atomic predicate is added in higher order of appearance frequency. On the other hand, in the third embodiment, the atomic predicate is deleted from all atomic predicates in lower order of appearance frequency. This concrete method of the third embodiment is different from the second embodiment.

2. Input/Output of the Apparatus

Input/output of the apparatus of the third embodiment are same as those of the first embodiment.

3. Flow of Processing

Figure 24:
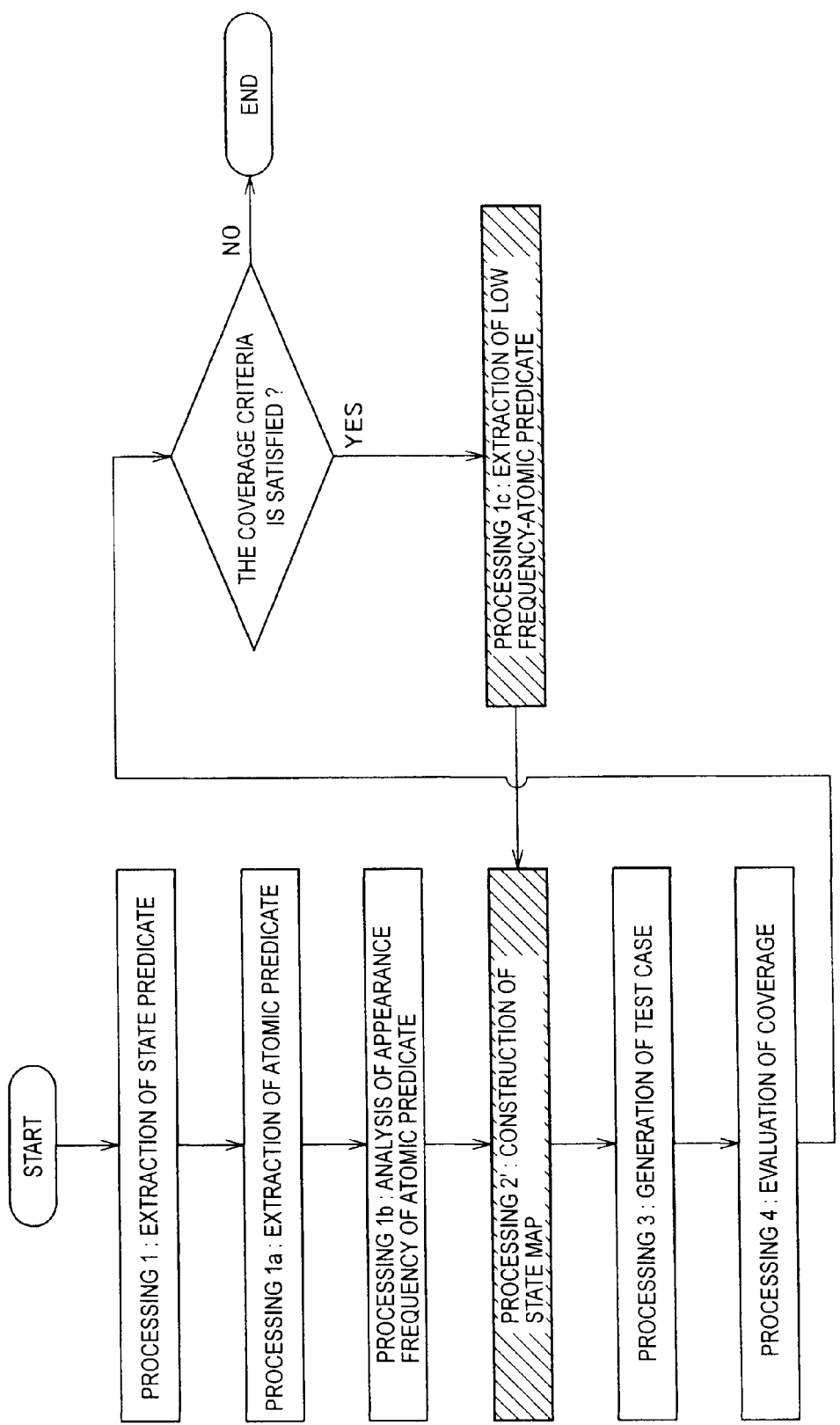
FIG. 24 is a flow chart of all processing of the test case generation apparatus according to a third embodiment.
Figure 25:
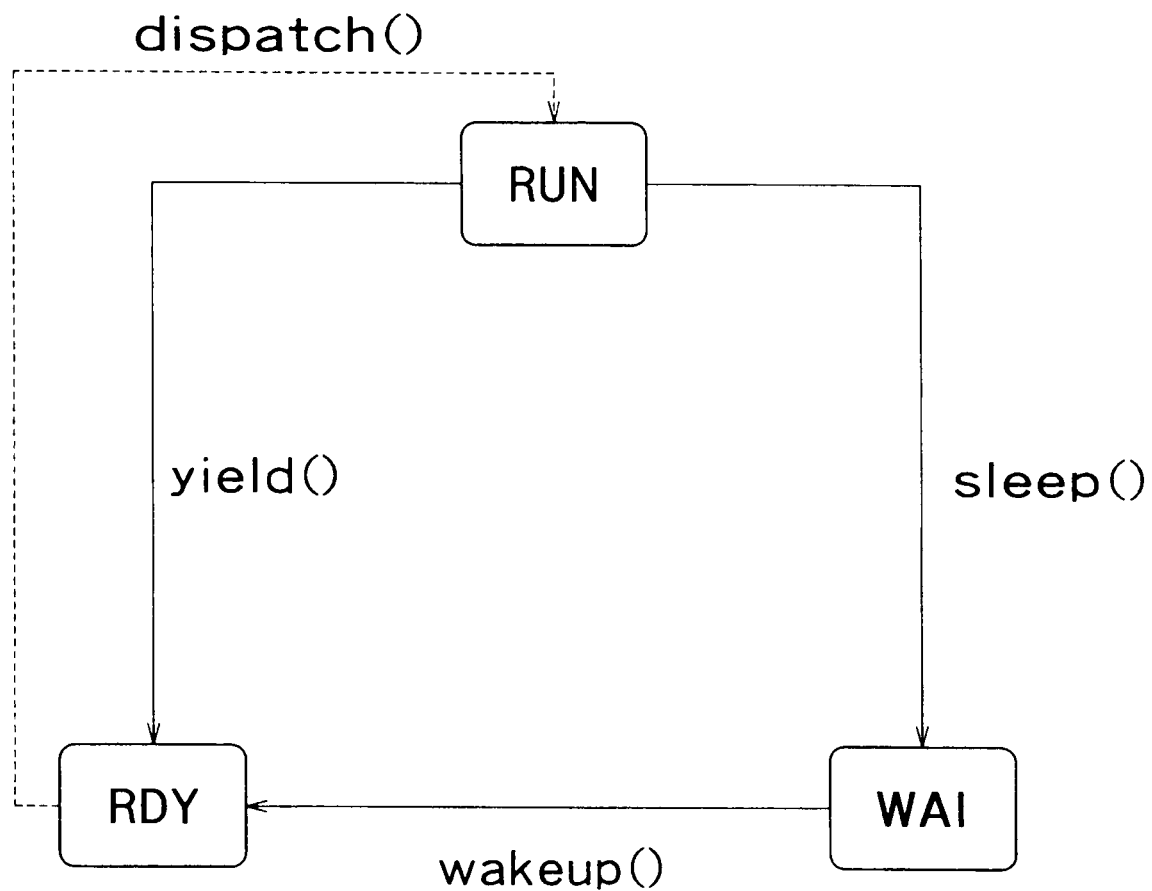
FIG. 25 is a schematic diagram to explain a task control monitor.

Flow of processing of the apparatus is explained. FIG. 24 is a flow chart of processing of the apparatus. The third embodiment is largely similar to the first embodiment, and parts different from the second embodiment are shown as oblique line blocks in the flow chart. Hereinafter, different parts from the second embodiment are mainly explained.

Processing 1c: Extraction of low frequency-atomic predicate

Processing: An atomic predicate having the lowest appearance frequency is deleted from the list of appearance frequency order acquired at the processing 1b.

Input: The list of appearance frequency order of atomic predicates

Output: The list of appearance frequency order of atomic predicates

Processing means: "The low frequency-atomic predicate extraction unit 7"

Processing 2': Construction of the state map

Processing: As to the list of atomic predicates output at processing 1a (the first time processing) or the list of appearance frequency order output at processing 1c (at least the second time processing), the state map is constructed as a direct product of all atomic predicates in the list. The direct product is calculated in the same way as the first embodiment.

Input: The list of atomic predicate, the list of appearance frequency order

Output: The state map

Processing means: "The state map generation unit 2"

4. Concrete Examples

Hereinafter, concrete examples of processing explained at "3. Flow of processing" are shown.

Step 1 (Processing 1: Extraction of state predicate)

Output: State predicates "P1notP2notP3", "P2", "P3"

Step 2 (Processing 1a: Extraction of atomic predicate)

Output: The list of atomic predicates "P1, P2, P3"

Step 3 (Processing 1b: Analysis of appearance frequency of atomic predicates)

Output: The list of appearance frequency order of atomic predicates "P2, P3, P1" (As to a list of atomic predicates acquired at Step 2, appearance frequency of each atomic predicate in a set of state predicates is calculated, and each atomic predicate is sorted in order of appearance frequency.)

Step 4: (Processing 2': Construction of the state map)

Output: The state map "define (fun s) (list (P1 s) (P2 s) (P3 s)))"

Step 5: (Processing 3: Generation of test case)

Output: A test case (FIG. 16) (A size of the test case: 15)

(The contracted state-transition system as intermediate data is shown in FIG. 18 (the number of states: 4, the number of state-transitions: 10))

Step 6: (Processing 4: Evaluation of coverage)

Output: The coverage 100%

The requirement item 1 is covered by a state-transition 9, and the requirement item 2 is covered by state-transitions 19 and 21.

Step 7 (Condition branch: coverage)

Output: Yes

Step 8: (Processing 1c: Extraction of low frequency-atomic predicate)

Output: The list of appearance frequency order of atomic predicate "P2, P3" ("P1" (an atomic frequency having the lowest appearance frequency in the list acquired at Step 3) is deleted from the list of appearance frequency.)

Step 9: (Processing 2': Construction of the state map)

Output: The state map "(define (fun s) (list (P2 s) (P3 s)))"

Step 10 (Processing 3: Generation of the test case)

Output: The test case (FIG. 23) (A size of the test case: 11)

(The contracted state-transition system as intermediate data is shown in FIG. 22 (the number of states: 3, the number of state-transitions: 7)

Step 11: (Processing 4: Evaluation of coverage)

Output: The coverage 100%

The requirement item 1 is covered by a state-transition 9, and the requirement item 2 is covered by a state-transition 12.

Step 12 (Condition branch: coverage)

Output: Yes

Step 13 (Processing 1c: Extraction of low frequency-atomic predicate)

Output: The list of appearance frequency order of atomic predicate "P2" ("P3" (an atomic frequency having the lowest appearance frequency in the list acquired at Step 8) is deleted from the list of appearance frequency.)

Step 14: (Processing 2': Construction of the state map)

Output: The state map "(define (fun s) (list (P2 s)))"

Step 15 (Processing 3: Generation of the test case)

Output: The test case (FIG. 21) (A size of the test case: 7)

(The contracted state-transition system as intermediate data is shown in FIG. 20 (the number of states: 2, the number of state-transitions: 4)

Step 16: (Processing 4: Evaluation of coverage)

Output: The coverage 50%

The requirement item 1 is covered by a state-transition 9, but the requirement item 2 is not covered.

Step 17 (Condition branch: coverage)

Output: No

Step 18: (Completion)

Output: The test case acquired at Step 10 (Processing is completed.)

<Supplement>

Idea of the second and third embodiments can be applied to the first embodiment. In case of applying the idea of the second embodiment, appearance frequency of state predicates (precondition or postcondition) in each requirement item is calculated, and a state map is constructed from a state predicate having the highest appearance frequency. A state-transition system is contracted by this state map, and a test case is generated from the contracted state-transition system, and evaluated. If the test case does not satisfy the coverage criteria, another state predicate (precondition or postcondition) having the second highest appearance frequency is added to the state map. A test case is generated from the state-transition system contracted by this state map, and evaluated. This processing is repeated until the test case satisfies the coverage criteria. In this way, by adding the state predicate (condition) to the state map, at least the coverage of the test case monotonously increases, and the coverage criteria is last satisfied.

As a reference, the reason why the coverage of the test case monotonously increases by adding the condition (atomic predicate) to the state map, is explained. Because, when the condition is added, the abstract state becomes more detailed. For example, if the state map is constructed by the precondition and the postcondition of requirement item 1 only, (precondition of requirement item 1: OK, postcondition of requirement item 1: NG) exists as one abstract state. Assume that a precondition of requirement item 2 is added to this state map. In this case, the one abstract state is detailed as (precondition of requirement item 1: OK, postcondition of requirement item 1: NG, precondition of requirement item 2: OK) and (precondition of requirement item 1: OK, postcondition of requirement item 1: NG, precondition of requirement item 2: NG). Briefly, one contracted state-transition is divided into two detailed state-transitions, and a detailed test case is acquired from the two detailed state-transitions. Accordingly, at least coverage of the test case monotonously increases.

Next, in case of applying the idea of the third embodiment, a state map is constructed from all state predicates (precondition or postcondition) appeared in each requirement item. A state-transition system is contracted by this state map. A test case is generated from the contracted state-transition system, and evaluated. If the test case satisfies the coverage criteria, a state predicate having the lowest appearance frequency is deleted from the state map, and a test case is generated from the state-transition system (contracted by this state map), and evaluated. This processing is repeated until the test case does not satisfy the coverage criteria. In this case, the test case having high efficiency (satisfying the coverage criteria last) can be generated.

[The Fourth Embodiment]

Figure 2:
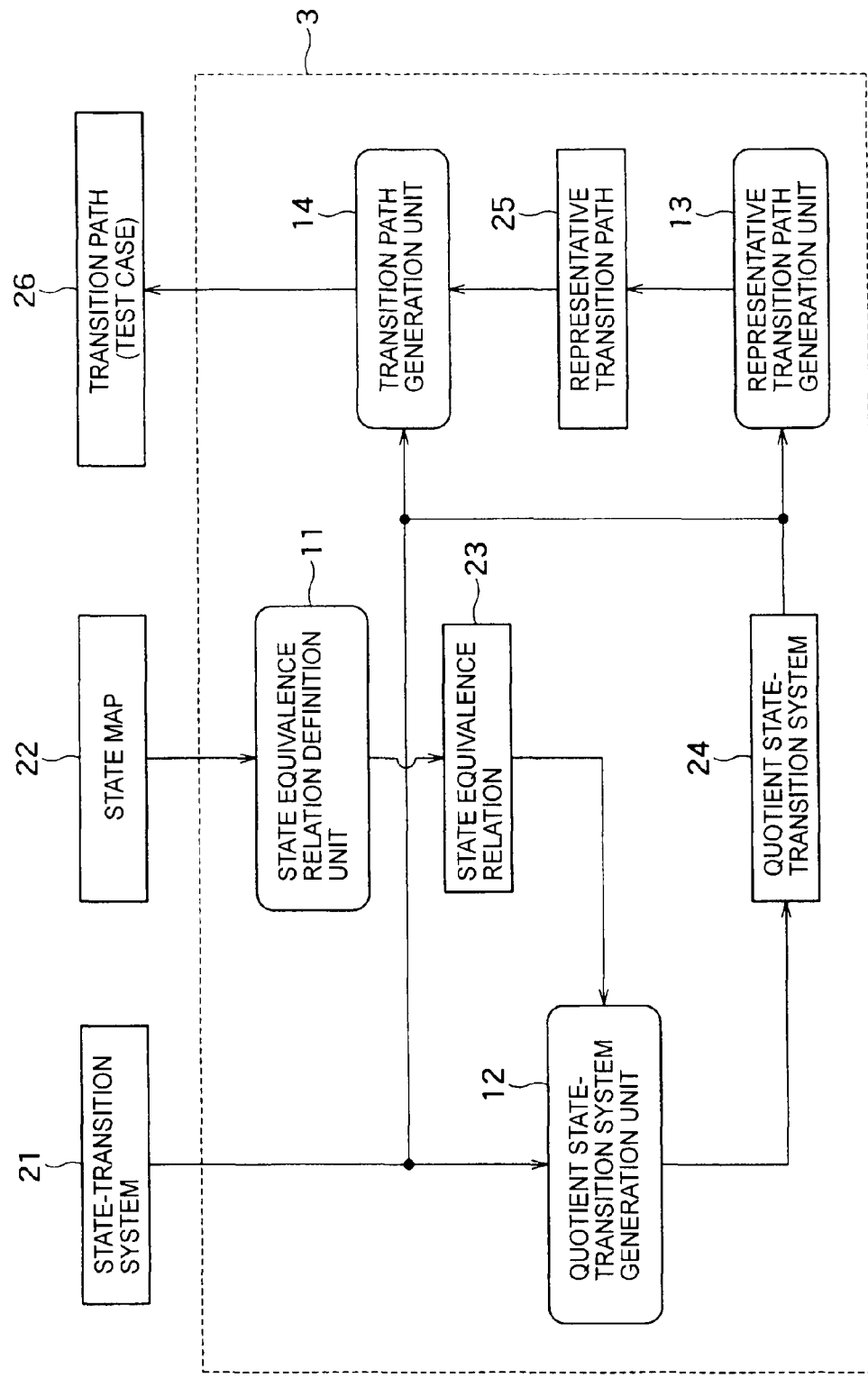
FIG. 2 is a block diagram of a test case generation unit in FIG. 1.
Figure 3:
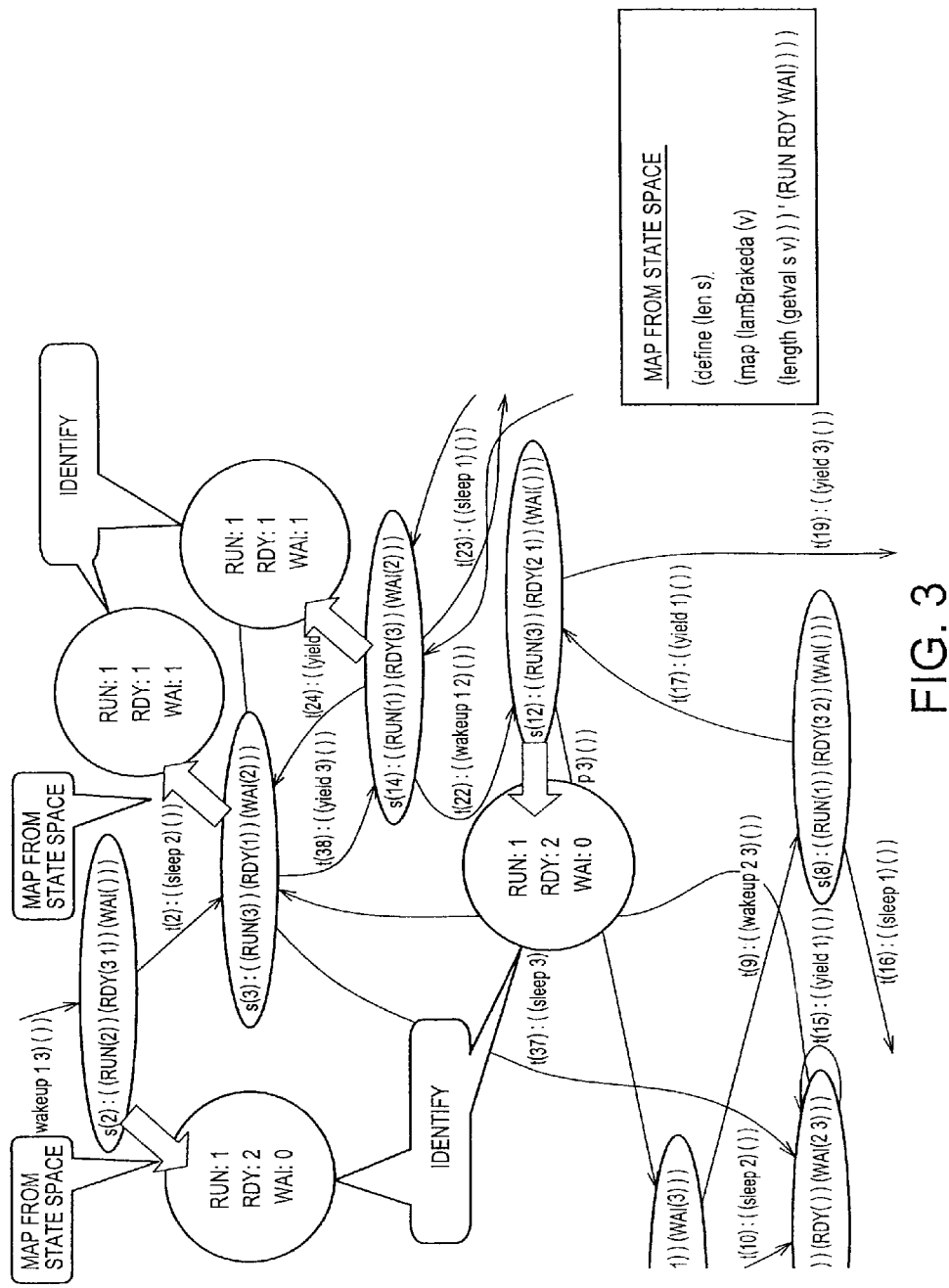
FIG. 3 is a schematic diagram of a map from state space as a contraction 1 of the state-transition system.
Figure 4:
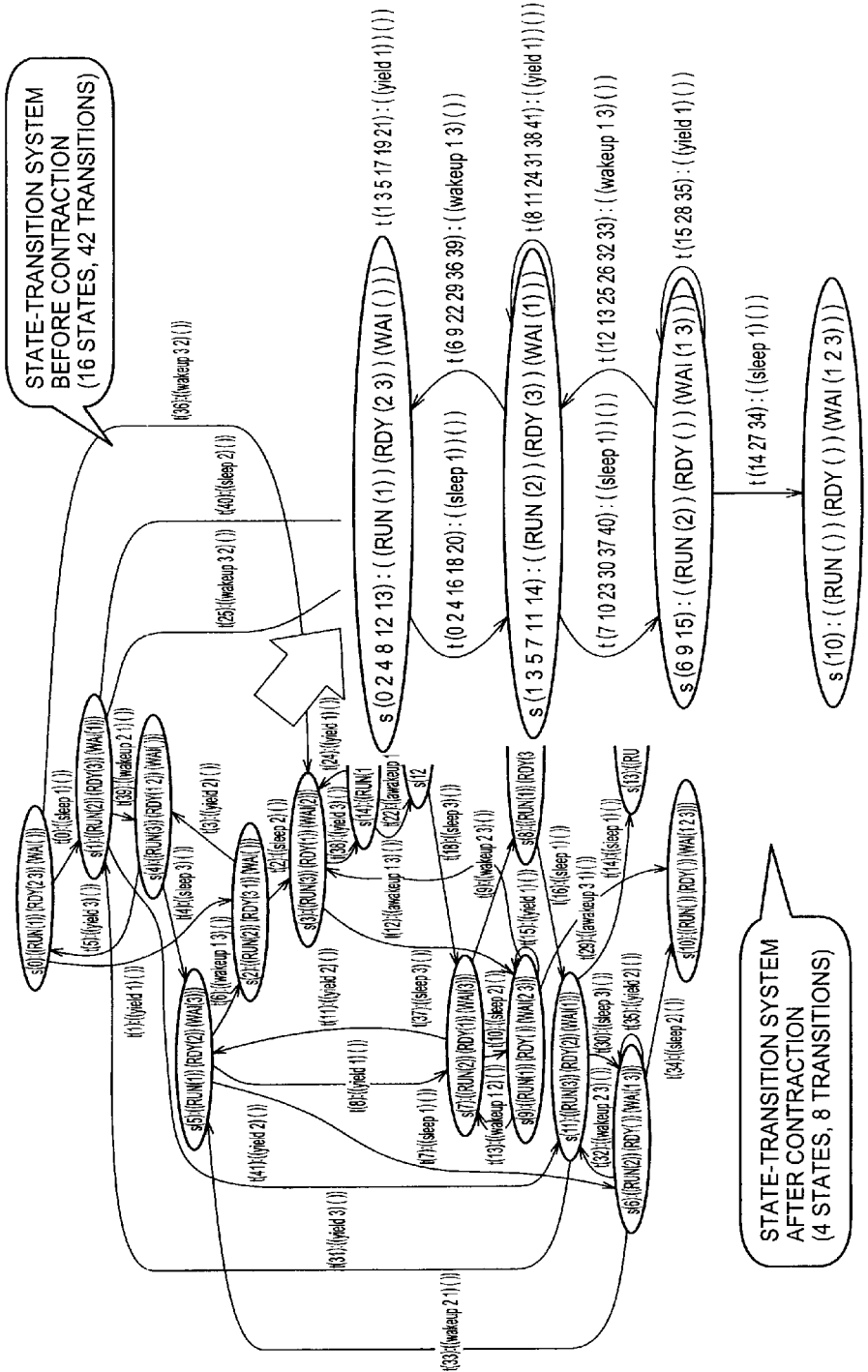
FIG. 4 is a schematic diagram of a contraction result as a contraction 2 of the state-transition system.

In the fourth embodiment, the test case generation unit 3 in FIG. 1 is explained in detail. FIG. 2 is a block diagram of component of the test case generation unit 3 in FIG. 1.

This test case generation unit 3 inputs the state-transition system 21 representing a plurality of states (possible for a system to be checked) and transitions (first transitions) between states, and the state map 22 defining map of the state. Furthermore, the test case generation unit 3 generates and outputs a test case (transition path) 26 of the system.

By using this test case, it is verified whether this system satisfies a specification. In detail, transitions (events) of the test case are actually occurred in the system. By confirming occurrence of the same operation as the state-transition system, the system can be confirmed whether to satisfy the specification.

<Task Control Monitor>

In an information system having a plurality of tasks, a monitor function to control an execution state of task is considered. Each task on the monitor has three states, i.e., an execution (RUN) state, an executable (RDY) state, and a sleep (WAI) state.

The monitor supplies three API (Application Programming Interface) functions to each task. The three API functions are a voluntary yield operation of CPU, a voluntary transition operation to sleep state, and a change (wakeup) operation from a sleep state to an executable (READY) state of task. These functions are called by a task of an execution (RUN) state.

Figure 26:
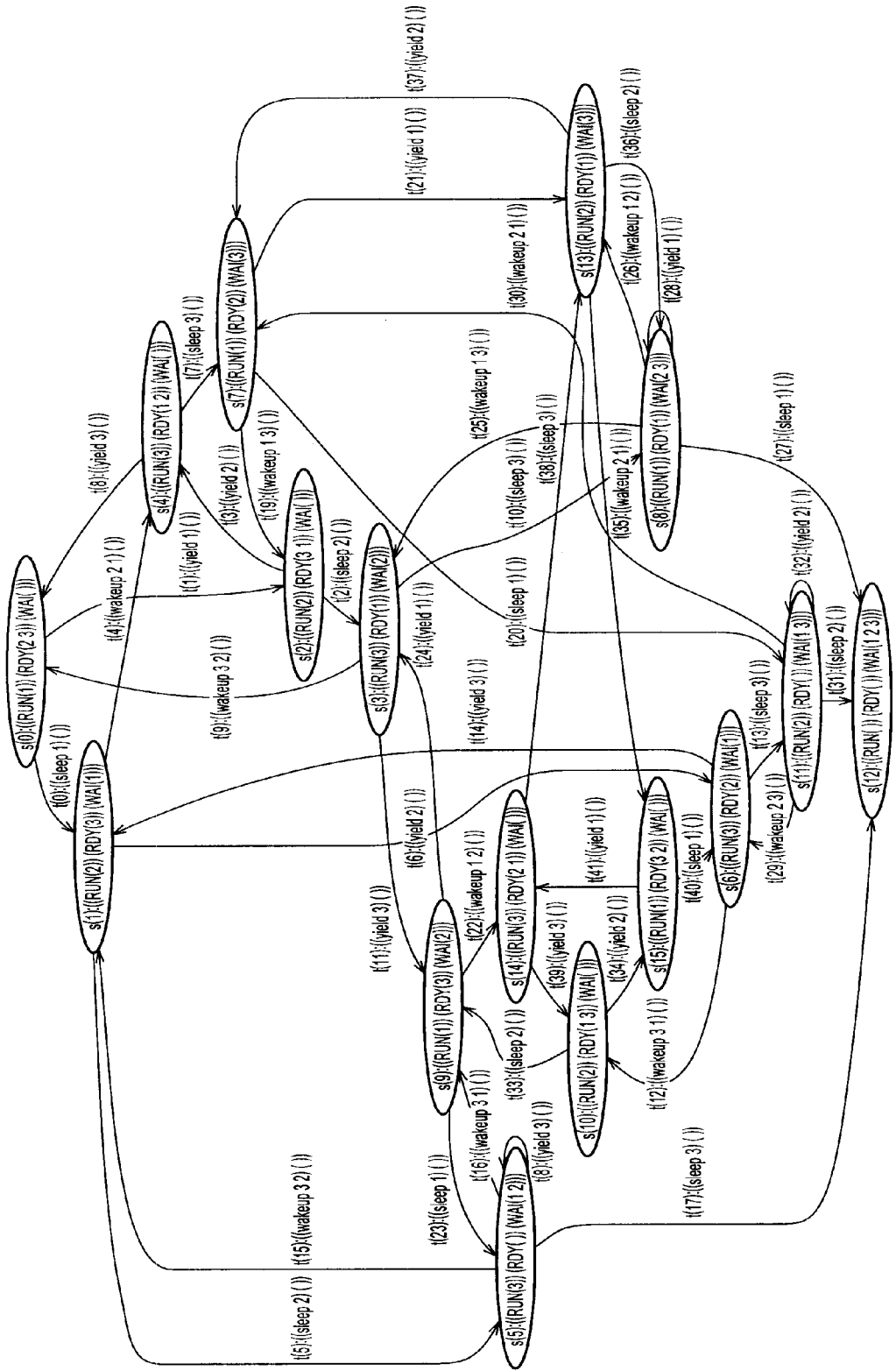
FIG. 26 is a schematic diagram of a state-transition system.

In case that the number of tasks is three, a state-transition system representing states (possible for the task control monitor) and transitions between states, is shown in FIG. 26. The state-transition system of FIG. 26 is a directed graph described by states of table 1 in FIG. 31 and transitions of table 2 in FIG. 32. The initial state is a state s0.

In detail, the table 1 represents an identifier (SID: State ID) of each state, and contents (state). The table 2 represents an identifier (TID: transition ID) of each transition, an identifier (SID0) of an origin state, an identifier (SID1) of a destination state, and contents (event) of the transition. However, a mapping result in the table 1 is added by processing of a state equivalence relation definition unit 11 explained afterwards. When the table 1 is input to the present apparatus, the mapping object does not exist.

<Instances of Test Case>

In order to confirm an operation of the task control monitor described as this state-transition system (FIG. 26, tables 1 and 2), by calling API function corresponding to transition of each task in order from initial state of the system, it is conformed whether the task is switched in correspondence with a destination state. For example, when a task 1 calls (sleep 1) from the initial state s0, a task 2 transits to executing (RUN). When the task 2 calls (sleep 2), a task 3 begins executing (RUN). When the task 3 calls (yield 3), the task 3 begins executing (RUN). In this way, the operation is confirmed. This confirmation steps correspond to a transition path "t0→t5→t18" from state s0 to state s5 on the state-transition system.

In order to perform confirmation of the system operation by the coverage and shortest steps, if the state-transition system is regarded as a directed graph, the shortest transition path to cover transition of the directed graph, and the system had better be operated by events corresponding to the shortest transition path (sequence).

A problem to generate the shortest transition sequence to cover transition of the directed graph is well known as Chinese Postman Problem (CPP), and an approximate algorithm to search a transition sequence to guarantee coverage already exists (Non-patent reference 1). In this case, approximation of the algorithm means generation of a transition sequence similar to the shortest transition sequence.

As to the transition sequence to cover transitions of the state-transition system (FIG. 26, sixteen states, forty-two transitions), searched result by the approximate algorithm is shown in table 3 of FIG. 33. By operating the system along four transition sequences (transition paths) from the initial state, forty-two transitions can be covered as continuous transitions of fifty times. Such transition sequence is called a test case of the system. Moreover, this transition sequence always starts from the initial state s0. The reason why the transition sequence is not one is, a state s12 is a state where the destination state does not exist and, when the transition enters into the state s12, a next transition cannot continue.

<Reduction of Size of Test Case>

As to a test to cover all transitions of the system, in general, when a scale of the system becomes large, a size of test case exponentially increases. Accordingly, this test is not realistic. In order to generate an executable test, it is necessary to reduce a size of test case by predetermined test criteria. In above-mentioned instance, the task control monitor includes sixteen states, but these states include the same state by changing sort of task IDs. For example, states s0 and s2 are same by changing order of task IDs, but states s0 and s1 are not same even if order of task IDs is changed. As an example of the predetermined test criteria, "same states by changing order of their task IDs are regarded as an equivalent state, and an operation of transition between states as non-equivalent state is only confirmed" is considered. By inputting this predetermined test criteria as a format of the state map, an effective test case (transition path) 26 satisfying this test criteria is automatically generated.

<Relation Between State Maps of the First~Third Embodiments and State Map of the Fourth Embodiment>

In the first, second and third embodiments, a state map to map a given state onto a combination of values of satisfiability (truth value) of each state predicate or each atomic predicate, is explained. On the other hand, in the fourth embodiment, as a material of explanation, it should be attentive that a state map to map onto the number of tasks of each state (RUN, RDY, WAI) is used as explained afterwards. In this way, even if a type of the state map is different, processing of the test case generation means is not essentially different. Accordingly, it is not a question.

<State-Transition System and Quotient State-Transition System>

Next, a state-transition system and a quotient state-transition system (contracted state-transition system) are explained.

The state-transition system F is defined as combination of a finite set S of state, a finite set T ($\subseteq$ S×S) of transition, and the initial state s0. The quotient state-transition system F/~ is defined by the state-transition system F and an equivalence relation "~" related to a state of the state-transition system F. The state of the quotient state-transition system F/~ is regarded as an equivalent class (group), in case of classifying states of the state-transition system F by equivalence relation "~". If a transition exists between two states s and s', a transition ([s], [s']) also exists between two equivalent classes respectively including one of the two states s and s'. Accordingly, a transition in the quotient state-transition system F/~ is determined as a transition relation between two equivalent classes.

State-transition system: F=<S, T, s0>
State set: S
Transition set: T$\subseteq$S×S
Initial state: s0$\in$S
Quotient state-transition system: F/~=<S/~, T/~, [s0]>
Quotient state: S/~={[s]|s$\in$S}
Quotient transition: T/~={([s], [s'])|(s,s')$\in$T}

Relation "~" represents above-mentioned equivalence relation (equiv), and the equivalent class [s] is a set which state s is a representative state and equivalent states are collected by the equivalence relation.

Equivalent class: $[s]=\{s'\in S|$ equiv $(s,s')$=true$\}$

Moreover, as to each transition t=(s,s')$\in$T in the state-transition system, a function to refer states before and after the transition t is denoted as src(t)=s and dst(t)=s'.

Origin state of the transition: src: T→S
Destination state of the transition: dst: T→S <Definition of State Equivalence Relation>

In order to calculate the quotient state-transition system from the state-transition system, equivalence relation between states need be defined. As a definition of the equivalent relation, the equivalent relation "equiv (s ,s')" between states need satisfy a reflexive law, a symmetric law and a transitive law. Moreover, "B" represents a set of boolean value (truth value) representing truth or false. In case of "s=s'", "equiv(s,s)" replies truth.

Equivalence relation, equiv: S×S→B
Reflective law: $\forall$s$\in$S equiv(s,s)
Symmetric law: $\forall$s$\in$S. $\forall$s'$\in$S. equiv(s,s')$\Rightarrow$ equiv(s',s)
Transitive law: $\forall$s$\in$S. $\forall$s$\propto\in$S. equiv(s,s')$\wedge$ equiv(s', s")$\Rightarrow$ equiv(s,s")

<Construction of State Equivalence Relation>

In order to construct the state equivalence relation, a state map 22 to abstract the state is prepared, and input to the test case generation unit 3. The state equivalence relation definition unit 11 defines a state equivalence relation 23 (table 4 in FIG. 34) used for generation of the quotient state-transition system 24, from the state map 22 and the state-transition system 21. Moreover, a function "equal?" is an equal sign relation on a range V of the map.

State map, map: S→V
Equivalence relation, equiv(s,s')=equal?(map(s),map(s'))

Figure 28:
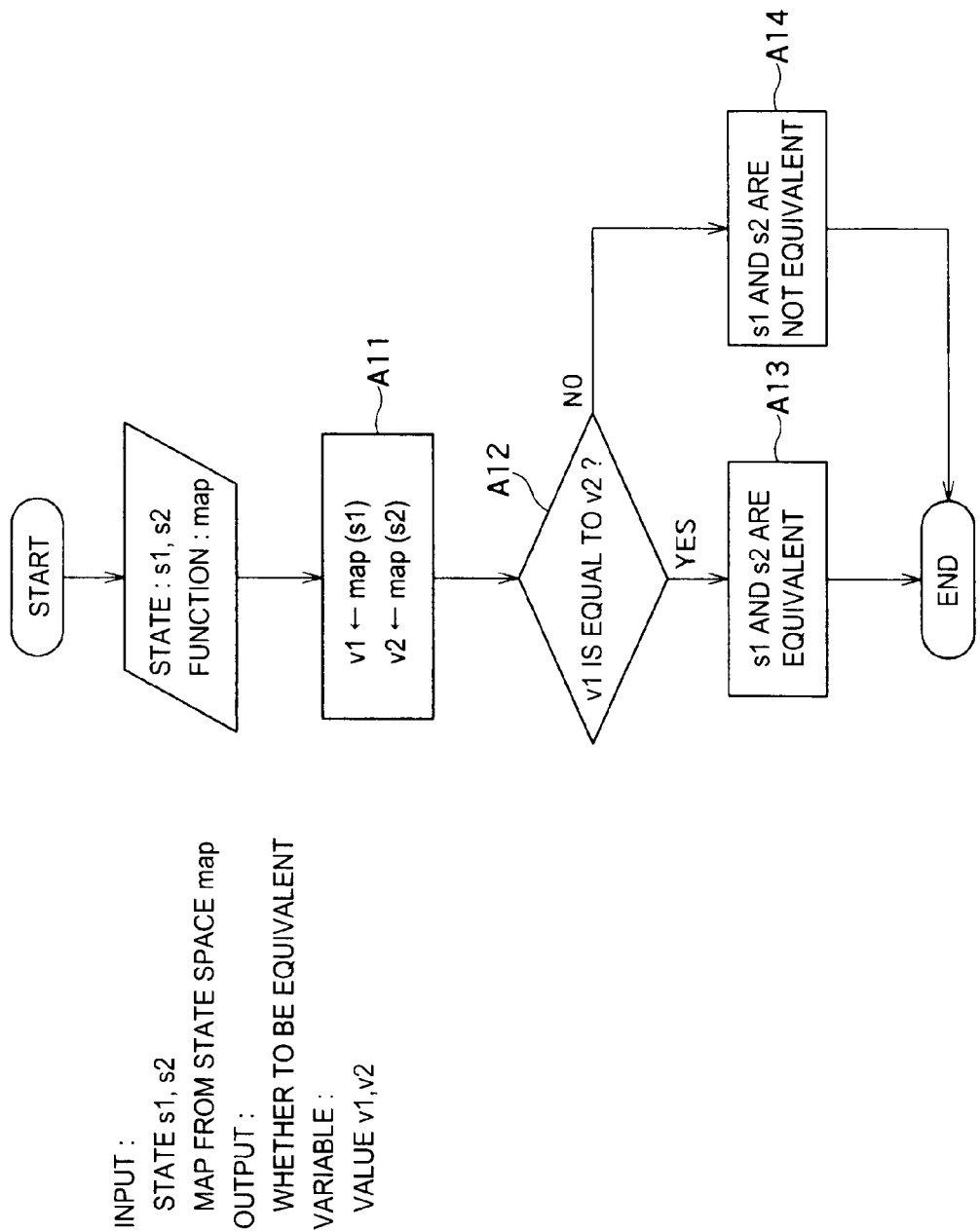
FIG. 28 is a flow chart to explain steps to define a state equivalence relation.

FIG. 28 is a flow chart of processing to define the equivalence relation between states. This processing is executed by the state equivalence relation definition unit 11. First, two states s1 and s2 are extracted from the state-transition system 21. By supplying the two states s1 and s2 to the state map 22, mapped values of two states s1 and s2 are respectively calculated (A11). If two mapped values are equal (Yes at A12), it is decided that two states s1 and s2 are equivalent (A13). If two mapped values are not equal (No at A12), it is decided that two states s1 and s2 are not equivalent (A14). In this way, the state equivalence relation definition unit 11 acquires each mapped value by mapping each state included in the state-transition system by the state map 22. Based on the mapped value, by classifying states having the same mapped value into one group, each states is grouped into a plurality of classes (groups).

Instance: task control monitor

As to a plurality of states which is equivalent by changing their task IDs based on test criteria, an instance of a state map to identify the plurality of states is represented as follows. This instance is described by a form of known programming language Scheme (Non-patent reference 2).

Map Instance:
(define (lens s) (map (lambda (v) (length (getval s v)))' (RUN RDY WAI)))

Function Instance:
In case of S=((RUN(1))(RDY(2 3))(WAI( )), (len s)$\Rightarrow$ (1 2 0)

In case of S=((RUN( ))(RDY( ))(WAI(1 2 3)), (len s)$\Rightarrow$ (0 0 3)

In above instance, on the assumption that contents of state in table 1 of FIG. 31 is stored into a variable s by a list format of programming language Scheme (Non-patent reference 2), a function to reply a length of a list of variables (RUN,RDY, WAI) to manage the state of each task is used. Moreover, a function "getval" is a function to acquire a corresponding value from a name of the variable. An application result of this function to each state is shown at the right side row (mapping result or mapped value) of table 1 in FIG. 31. As to a plurality of states having the same mapped value, the plurality of states is equivalent, and classified into an equivalent class. This classification result is shown in table 4 of FIG. 34. Assume that a state representing the equivalent class has the smallest state ID. In this case, a representative state [SID] of the equivalent class is four kinds, i.e., s0, s1, s5 and s12.

A state of the quotient state-transition system is an equivalent class (Hereinafter, a state class) of the state, and a transition in the quotient state-transition system is a transition between two state classes. If a transition relation (of the state-transition system 21) exists between two states respectively included in two state classes, the transition relation also exists between the two state classes.

An algorithm to generate the quotient state-transition system is represented hereinafter. Furthermore, processing flow corresponding to this algorithm is shown in a flow chart of FIG. 29. This algorithm is executed by a quotient state-transition system generation unit 12. The quotient state-transition system generation unit 12 inputs a state equivalence relation 23 (table 4 in FIG. 34) and a state-transition system 21, and generates a quotient state-transition system 24 according to a following algorithm.

<Generation Algorithm of Guotient State-Transition System>

In description of the following algorithm, a sign "φ" means a null set, and a sign "←" means a substitution of the right side to the left side. "KEYS" means a step to acquire a range of the map, and "P(X)" means a power set of X as the set of all subsets of X.

Input: state transition system F, equivalence relation "equiv"
Output: Quotient state-transition system F/~
Variable: S→S
Step 1: equivalence classification of states (B11 in flow chart of FIG. 29)

```
Pre: SMAP is null
Post: SMAP is equivalence classification result of states
SMAP ← φ
for each s ∈ S do
    if ∃s' ∈KEYS(SMAP). Equiv(s,s') then
        SMAP(s') ← SMAP(s')∪{s}
    else
        SMAP(s) ← {s}
    end if
end do
```

Step 2: Determination of representative state (B12 in flow chart of FIG. 29)

```
Pre: SMAP is equivalence classification result of states
Post: REPL is correspondence table of representative states
REPL ← φ
for each s ∈KEYS(SMAPS) do
    for each s' ∈SMAP(s) do
        REPL(s') ← s
    end do
end do
```

Figure 29:
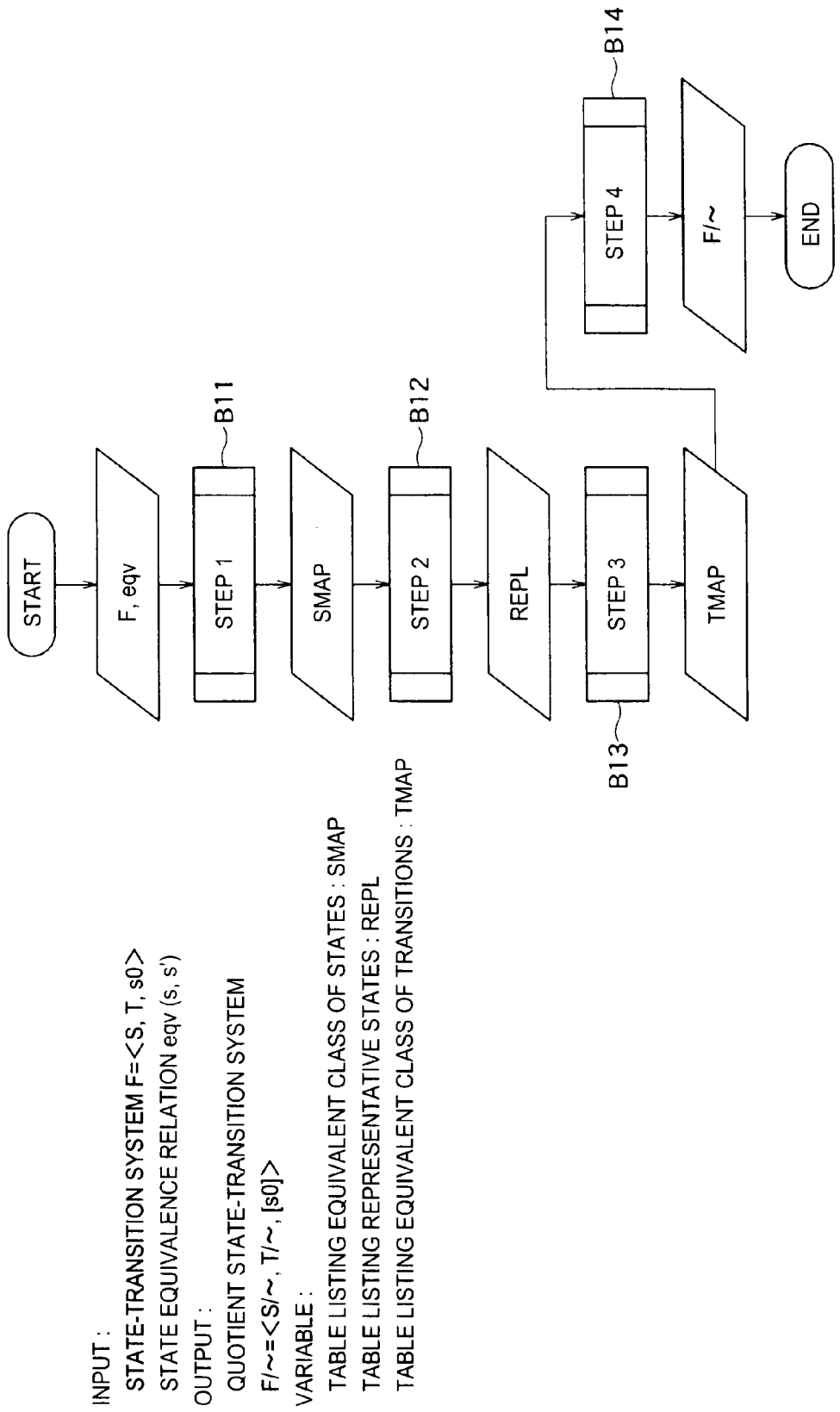
FIG. 29 is a flow chart to explain steps to generate a quotient state-transition system.

Step 3: equivalence classification of transitions (B13 in flow chart of FIG. 29)

```
Pre: TMAP is null, REPL is correspondence table of
representative states
Post: TMAP is equivalence classification result of
transitions
for each t ∈T do
    key ← (REPL(src(t)), REPL(dst(t)))
    if ∃t' ∈KEYS(TMAP). Key=t' do
        TMAP(t') ← TMAP(t')∪{t}
    else
        TMAP(key) ← {t}
    end if
end do
```

Step 4: output of result (B143 in flow chart of FIG. 29)
"S/~" is determined from a state classification table SMAP, "T/~" is determined from a transition classification table TMAP, the quotient state transition system "F/~=<S/~, T/~, [s0]>" is output, and processing is terminated.

Instance: Task Control Monitor

In the state equivalence relation definition unit 11, when classification of states into equivalent class is completed, a representative state [SID] of each state SID is determined (the left side row in table 4 of FIG. 34). A state class as a state of the quotient state-transition system is labeled with an ID of the representative state.

Furthermore, as to transition in the quotient state-transition system, as shown in a transition table 5 of FIG. 35, two representative states ([SID0], [SID1]) of two state classes to which a source state (SID0) and a destination state (SID1) of each transition belong are searched, and transitions each hav-ing the same pair of two representative states are classified into an equivalent class (table 6 in FIG. 36). In this case, a transition having the smallest TID is used as a representative transition [TID] to identify a transition class. In FIG. 36, eight transition classes exist, i.e., t0, t1, t4, t5, t6, t15, t17 and t18.

Figure 27:
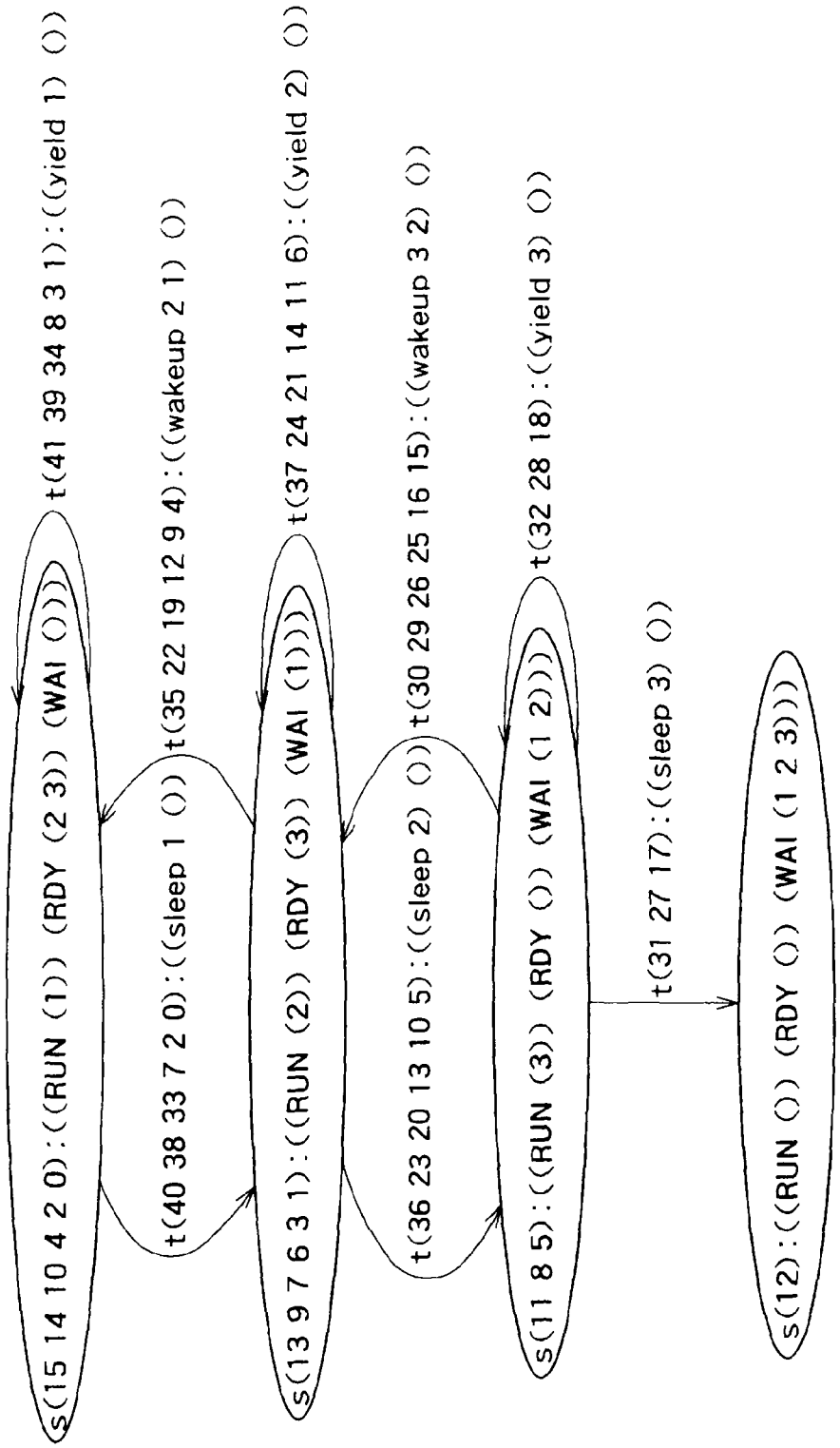
FIG. 27 is a schematic diagram of a quotient state-transition system.

FIG. 27 shows the quotient state-transition system (four states, eight transitions) 24 acquired. This corresponds to the table 6 in FIG. 36. States and transitions in the quotient state-transition system respectively include states and transitions in original state-transition system. As contents (state) and transition (event), a state of the representative state and an event of the representative transition are respectively described.

At completion timing of step 1 (B11) in FIG. 29, SMAP is represented as follows.

$SMAP(s0)=\{s0, s2, s4, s10, s14, s15\}$ $SMAP(s1)=\{s1, s3, s6, s7, s9, s13\}$ $SMAP(s5)=\{s5, s8, s11\}$ $SMAP(s12)=\{s12\}$

At completion timing of step 2 (B12) in FIG. 29, REPL is represented as follows.

$REPL(s0)=s0$ $REPL(s1)=s1$ $REPL(s2)=s0$

... (omission)

$REPL(s14)=s0$ $REPL(s15)=s0$

At completion timing of step 3 (B13) in FIG. 29, TMAP is represented as follows.

$TMAP((s0,s0))=\{t1, t3, t8, t34, t39, t41\}$ $TMAP((s0,s1))=\{t0, t2, t7, t33, t38, t40\}$

... (omission)

$TMAP((s5,s5))=\{t18, t28, t32\}$

If KEYS are represented in above-mentioned example of SMAP, "KEYS(SMAP)={s0, s1, s5, s12}" is concluded.

In this way, in the quotient state-transition system generation unit 12, two groups (combination of two representative states) are indicated from a plurality of groups in order. Then, as to the two groups (two representative states (two classes)), if a transition (first transition) from one state included in one group to one state included in another group exists, a transition (second transition) from the one group to the another group is set. This processing (two groups are indicated, the second transition is set) is repeated. In this way, the quotient state-transition system representing the second transition between groups (between representative states or between classes) is generated.

<Method for Converting Transition Path>

The representative transition path generation unit 13 searches a path 25 (representative transition path 25 expressed by representative states or representative transition events) covering transitions in the quotient state-transition system 24 (FIG. 27). In this case, for example, well-known algorithm (Non-patent reference 1) can be used. The transition path executable as a test is a continuous transition path starting from the initial state s0. The continuous transition path means that, in transition sequence, a destination state of the present transition is same as an origin state of a next transition. If a continuous representative transition path 25 on the quotient state-transition system is regarded as a transition path on the state-transition system, the transition path is not always continuous on the state-transition system. Accordingly, after the shortest representative transition path 25 (covering the quotient state-transition system 24) is generated, if this representative transition path 25 is not a continuous path on original state-transition system, it is necessary that the representative transition path 25 is converted to the continuous path. Conversion steps of the path are represented as follows. Furthermore, processing flow corresponding to the conversion steps is shown in flow chart of FIG. 30. This processing is executed by a transition path generation unit 14. Moreover, only when the transition path generation unit 14 decides that the representative transition path 25 is not the continuous path on the original state-transition system, this processing may be executed. Furthermore, without decision whether the representative transition path 25 is not the continuous path on the original state-transition system, this processing may be always executed.

Selection of transition SELECT: $T/^{\sim} \times S \to P(T)$

Function: transition starting from state s is selected from transition class [t].

Detail: SELECT: $T/^{\sim} \to P(S)$

Selection of state SOURCE: $T/^{\sim} \to P(S)$

Function: start points of transitions included in transition class [t] are listed.

Detail: SOURCE([t])={src(t')∈S|t'∈[t]}

Generation of path SHORTP: $S \times P(S) \to [T]$

Function: the shortest path is selected from paths transiting from a state s to a state set dsts.

Detail: SHORTP(s,dsts)=DIJKSTRA(s,s')

In this case, DIJKSTRA is well-known steps to calculate the shortest path (For example, Dijkstra' s Algorithm). Furthermore, as to state "s'∈dsts", a path length |DIJKSTRA(s,s")| is the shortest in state "s"∈dsts".

<Conversion Algorithm of Transition Path>

Input: start state s0, representative transition sequence tin=([t0], [t1], ... )

Output: transition sequence tout=(t0', t1', ... )

Figure 30:
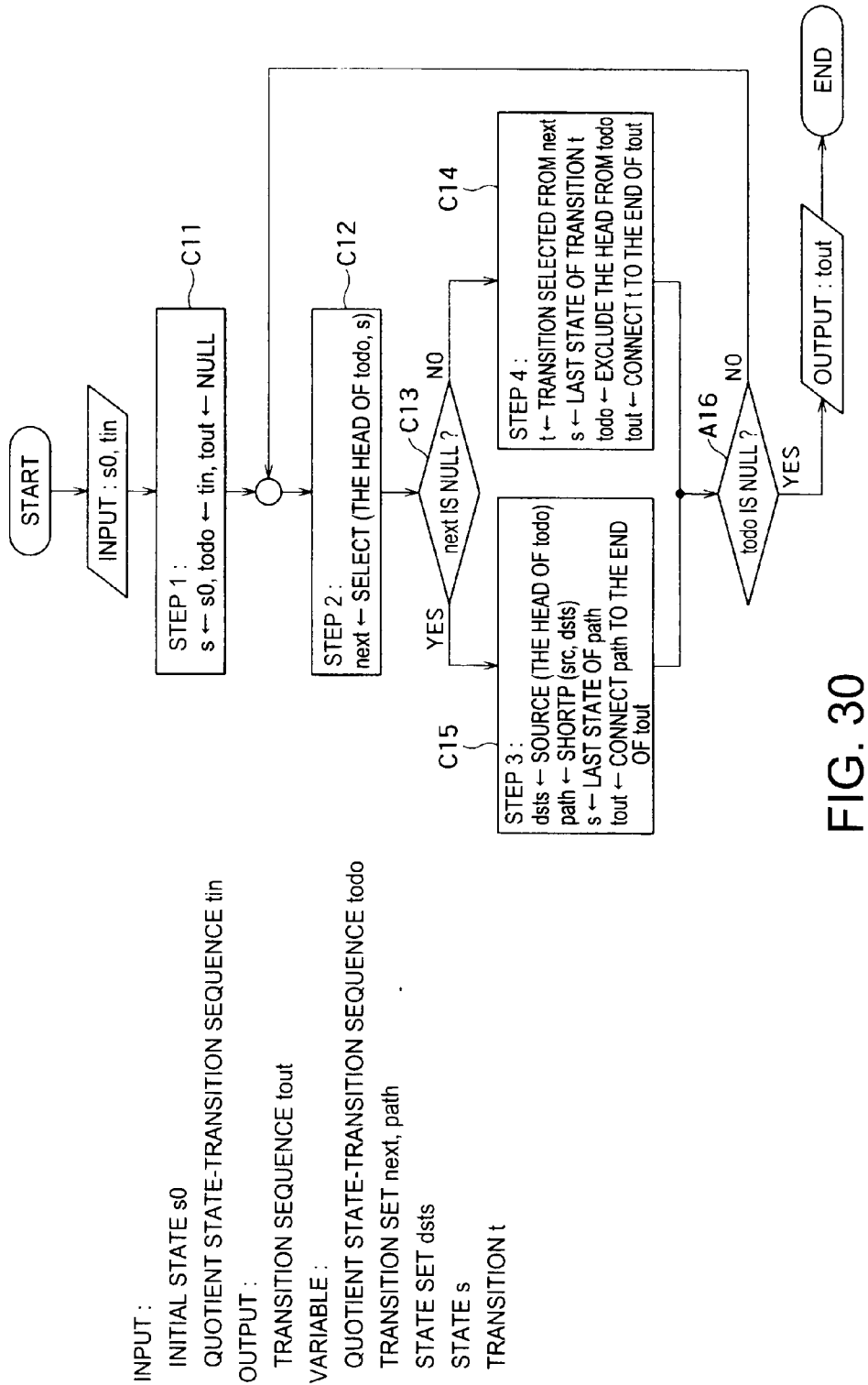
FIG. 30 is a flow chart to explain steps to generate a transition path.

Steps:

Step 1: initialization (C11 in flow chart of FIG. 30)

S←start state s0 todo←representative transition sequence tin tout←null sequence

Step 2: selection of transition (C12, C13 in flow chart of FIG. 30)

next←SELECT (the head of todo, s)

if a set next is null, then

Step 3: non-connection by selection (C15 in flow chart of FIG. 30)

dsts ← SOURCE(the head of todo)
path ← SHORTP(s,dst)
s ← last state of path "path"
tout ← tout + path
else Step 4: non-connection by selection (C14 in flow chart of FIG. 30)

t ← one transition selected from a transition set "next"
s ← dst(t)
todo ← the end of todo
tout ← tout + t
end if Step 5: decision of completion (C16 in flow chart of FIG. 30)

If a list todo is null, then
   to step 6
else
   to step 2
end if

Step 6: output of result

The transition path "tout" is output, and processing is terminated.

Instance: Task Control Monitor

The representative transition path generation unit 13 searches a path covering transitions of the quotient state-transition system 24 (FIG. 27) by using well-known algorithm (Non-patent reference 1). In this case, a transition sequence (representative transition path 25) shown in table 7 of FIG. 37 is acquired. This transition sequence is a continuous path on the quotient state-transition system 24 (FIG. 27), but it is not the continuous path on original state-transition system (FIG. 26). In this case, the transition sequence cannot be directly used as an executable test case.

For example, in the table 7 of FIG. 37, a transition sequence along representative transitions of the second path is t0→t6→t5→t15→t4→t1. However,in this case, a destination state and an origin state of the transition sequence are not continuously connected. For example, state classes of state s1 and state s6 are same. Accordingly, these states s1 and s6 are equivalent on the quotient state-transition system (FIG. 27), but they are different on the original state-transition system (FIG. 26).

If the representative transition path 25 is not a continuous path on the original state-transition system (FIG. 26), the transition path generation unit 14 acquires the transition path 26 executable by converting the transition path. Concretely, the transition path generation unit 14 suitably selects a transition from a transition class of the representative transition path 25, and generates a path of which state-transition is continuous on the original state-transition system.

If the path of which state-transition is continuous is not generated by selecting the transition, states of the path is continuously modified by using calculation algorithm of the shortest path (step 3 (C15 in FIG. 30)). Briefly, as to an object transition class from which a continuous path cannot be generated, a destination state of a transition selected from a previous transition class is set to an origin state. Then, a path from the origin state to any state included in destination states of the object transition class is generated and used.

In this case, by inputting a path of the quotient state-transition system, an operation to calculate a path of which states continuously transits on the original state-transition system is called "path-generation" (or path-regeneration). Algorithm of path-generation (path-regeneration) is already explained by referring to FIG. 30.

By inputting the transition path (table 7 in FIG. 37) and the initial state s0, application result of the path-generation (path-regeneration) algorithm is shown in table 8 of FIG. 38. As to a transition path of the table 8, the initial state is a state s0, and the transition path is acquired by selecting one transition from transitions included in each transition class (table 7 in FIG. 37). As a result, this transition path is an executable path of which states continuously transit on the original state-transition system. In the table 8 of FIG. 38, the transition path becomes the minimum test case satisfying the initial test criteria that "all states and transitions between states are covered without distinguishing task IDs".

In this way, the transition path generation unit 14 selects each transition (first transition) of the representative transition path 25 in order of each second transition traced by the representative transition path generation unit 13. Then, as to each first transition selected, the transition path generation unit 14 specifies a first transition. The first transition has the same origin state as one of origin states of a selected second transition, the same destination state as one of destination states of the selected second transition, and the same origin state as a destination state of a previous first transition specified. As mentioned-above, the first transition is included in the original state-transition system. The transition path generation unit 14 generates a test case (transition path) including a sequence of each first transition specified and an event corresponding to each first transition.

As mentioned-above, when the first transition is not specified for one second transition of the second transitions selected in order, the transition path generation unit 14 selects a first transition. The first transition has the same origin state as a destination state of another first transition specified for a previous second transition selected, and has the same destination state as one of destination states of the one second transition. In this way, the transition path generation unit 14 generates the transition path so that the states of the first transitions continue on the original state-transition system.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for generating a test case of a system to be checked, comprising:
    a first memory configured to store a state-transition system including a plurality of states and a first transition between two of the plurality of states in the system, each state being represented by a plurality of internal variables, the first transition representing a state-change based on an external event occurred into the system;
    a second memory configured to store a plurality of requirement items each including a precondition and a postcondition in correspondence with the external event, the precondition describing a state of the system before occurrence of the external event, the postcondition describing a state of the system after occurrence of the external event;
    a state predicate extraction unit configured to select m (m: an integral number equal to or larger than one) requirement items from the second memory, and extract the precondition and the postcondition from the m requirement items;
    a state map generation unit configured to generate a state map to map an indicated state onto truth values of the precondition and the postcondition;
    a state equivalence relation definition unit configured to acquire a plurality of mapped values by mapping each of the plurality of states by the state map, and generate a plurality of groups each including states having the same mapped value;
    a quotient state-transition system generation unit configured to select two groups from the plurality of groups, set a second transition from one of the two groups to the other of the two groups when the first transition from one state included in the one to one state included in the other exists in the state-transition system, and generate a quotient state-transition system including a plurality of second transitions among the plurality of groups by repeating selection of the two groups and set of the second transition;
    a representative transition path generation unit configured to generate a representative transition path as a sequence of each second transition by tracing the plurality of second transitions from a predetermined group of the plurality of groups;
    a transition path generation unit configured to select the second transition from the representative transition path in order of the tracing, specify the first transition of which an origin state is same as one state of an origin group of the selected second transition and a destination state of a previous first transition specified, a destination state is same as one state of a destination group of the selected second transition, and generate a test case including a sequence of each first transition specified; and
    an output unit configured to output the test case.

2. An apparatus for generating a test case of a system to be checked, comprising:
    a first memory configured to store a state-transition system including a plurality of states and a first transition between two of the plurality of states in the system, each state being represented by a plurality of internal variables, the first transition representing a state-change based on an external event occurred into the system;

a second memory configured to store a plurality of requirement items each including a precondition and a postcondition in correspondence with the external event, the precondition describing a state of the system before occurrence of the external event, the postcondition describing a state of the system after occurrence of the external event, the precondition and the postcondition being respectively represented by a logical operation of at least one atomic predicate defining a condition of one internal variable;

an atomic predicate extraction unit configured to select m (m: an integral number equal to or larger than one) requirement items from the second memory, and extract all atomic predicates included in the precondition and the postcondition from the m requirement items;

a state map generation unit configured to select h (h: an integral number equal to or larger than one) atomic predicates from the all atomic predicates, and generate a state map to map an indicated state onto truth values of the h atomic predicates;

a state equivalence relation definition unit configured to acquire a plurality of mapped values by mapping each of the plurality of states by the state map, and generate a plurality of groups each including states having the same mapped value;

a quotient state-transition system generation unit configured to select two groups from the plurality of groups, set a second transition from one of the two groups to the other of the two groups when the first transition from one state included in the one to one state included in the other exists in the state-transition system, and generate a quotient state-transition system including a plurality of second transitions among the plurality of groups by repeating selection of the two groups and set of the second transition;

a representative transition path generation unit configured to generate a representative transition path as a sequence of each second transition by tracing the plurality of second transitions from a predetermined group of the plurality of groups;

a transition path generation unit configured to select the second transition from the representative transition path in order of the tracing, specify the first transition of which an origin state is same as one state of an origin group of the selected second transition and a destination state of a previous first transition specified, a destination state is same as one state of a destination group of the selected second transition, and generate a test case including a sequence of each first transition specified;

a coverage evaluation unit configured to evaluate whether the test case covers the first transition of which the origin state and the destination state respectively satisfy the precondition and the postcondition of each of the m requirement items, and calculate a coverage as a ratio or the number of satisfied requirement items in the m requirement items; and an output unit configured to output the test case when the coverage satisfies a criteria;

wherein the state map generation unit generates the state map by selecting the h atomic predicates so that the coverage satisfying the criteria is calculated.

3. The apparatus according to claim 2, further comprising:
an appearance frequency analysis unit configured to calculate an appearance frequency of each of the all atomic predicates in the m requirement items,
wherein the state map generation unit repeatedly generates the state map by selectively adding one atomic predicate in higher order of the appearance frequency, until the coverage satisfies the criteria.

4. The apparatus according to claim 2, further comprising:
an appearance frequency analysis unit configured to calculate an appearance frequency of each of the all atomic predicates in the m requirement items,
wherein the state map generation unit generates the state map by using the all atomic predicates, and repeatedly generates the state map by selectively deleting one atomic predicate in lower order of the appearance frequency from the all atomic predicates, while the coverage satisfies the criteria.

5. A method for generating a test case of a system to be checked in a computer, comprising:
reading from a first memory, a state-transition system including a plurality of states and a first transition between two of the plurality of states in the system, each state being represented by a plurality of internal variables, the first transition representing a state-change based on an external event occurred into the system;
selecting m (m: an integral number equal to or larger than one) requirement items from a second memory that stores a plurality of requirement items each including a precondition and a postcondition in correspondence with the external event, the precondition describing a state of the system before occurrence of the external event, the postcondition describing a state of the system after occurrence of the external event;
extracting the precondition and the postcondition from the m requirement items;
generating a state map to map an indicated state onto truth values of the precondition and the postcondition;
acquiring a plurality of mapped values by mapping each of the plurality of states by the state map;
generating a plurality of groups each including states having the same mapped value;
selecting two groups from the plurality of groups;
setting a second transition from one of the two groups to the other of the two groups when the first transition from one state included in the one to one state included in the other exists in the state-transition system;
generating a quotient state-transition system including a plurality of second transitions among the plurality of groups by repeating the selecting two groups and the setting;
generating a representative transition path as a sequence of each second transition by tracing the plurality of second transitions from a predetermined group of the plurality of groups;
selecting the second transition from the representative transition path in order of the tracing;
specifying the first transition of which an origin state is same as one state of an origin group of the selected second transition and a destination state of a previous first transition specified, a destination state is same as one state of a destination group of the selected second transition
generating a test case including a sequence of each first transition specified; and
outputting the test case.

6. A method for generating a test case of a system to be checked in a computer, comprising:

selecting from a first memory, a state-transition system including a plurality of states and a first transition between two of the plurality of states in the system, each state being represented by a plurality of internal variables, the first transition representing a state-change based on an external event occurred into the system;

selecting m (m: an integral number equal to or larger than one) requirement items from a second memory that stores a plurality of requirement items each including a precondition and a postcondition in correspondence with the external event, the precondition describing a state of the system before occurrence of the external event, the postcondition describing a state of the system after occurrence of the external event, the precondition and the postcondition being respectively represented by a logical operation of at least one atomic predicate defining a condition of one internal variable;

extracting all atomic predicates included in the precondition and the postcondition from the m requirement items;

selecting h (h: an integral number equal to or larger than one) atomic predicates from the all atomic predicates;

generating a state map to map an indicated state onto truth values of the h atomic predicates;

acquiring a plurality of mapped values by mapping each of the plurality of states by the state map;

generating a plurality of groups each including states having the same mapped value;

selecting two groups from the plurality of groups;

setting a second transition from one of the two groups to the other of the two groups when the first transition from one state included in the one to one state included in the other exists in the state-transition system;

generating a quotient state-transition system including a plurality of second transitions among the plurality of groups by repeating the selection the two groups and the setting;

generating a representative transition path as a sequence of each second transition by tracing the plurality of second transitions from a predetermined group of the plurality of groups;

selecting the second transition from the representative transition path in order of the tracing;

specifying the first transition of which an origin state is same as one state of an origin group of the selected second transition and a destination state of a previous first transition specified, a destination state is same as one state of a destination group of the selected second transition;

generating a test case including a sequence of each first transition specified;

evaluating whether the test case covers the first transition of which the origin state and the destination state respectively satisfy the precondition and the postcondition of each of the m requirement items;

calculating a coverage as a ratio or the number of satisfied requirement items in the m requirement items; and outputting the test case when the coverage satisfies a criteria;

wherein the state map is generated by selecting the h atomic predicates so that the coverage satisfying the criteria is calculated.

* * * * *